(12) United States Patent
Saltsidis et al.

(10) Patent No.: US 11,696,182 B2
(45) Date of Patent: *Jul. 4, 2023

(54) CORE NETWORK NODE, USER EQUIPMENT AND METHODS IN A PACKET COMMUNICATIONS NETWORK

(71) Applicant: Telefonaktiebolaget LM Ericsson (publ), Stockholm (SE)

(72) Inventors: Panagiotis Saltsidis, Stockholm (SE); Ralf Keller, Würselen (DE); Angel Navas Cornejo, Leganes (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,115

(22) Filed: Feb. 28, 2022

(65) Prior Publication Data

US 2022/0182886 A1    Jun. 9, 2022

Related U.S. Application Data

(63) Continuation of application No. 17/052,489, filed as application No. PCT/SE2018/050486 on May 9, 2018, now Pat. No. 11,304,098.

(51) Int. Cl.
*H04W 28/20* (2009.01)
*H04W 24/10* (2009.01)
(Continued)

(52) U.S. Cl.
CPC .......... *H04W 28/20* (2013.01); *H04W 24/10* (2013.01); *H04W 28/0268* (2013.01); *H04W 28/22* (2013.01); *H04W 28/24* (2013.01)

(58) Field of Classification Search
CPC . H04W 28/22; H04W 28/0268; H04W 28/24; H04W 24/10; H04W 28/20; H04W 28/0247; H04L 47/74; H04L 47/822
See application file for complete search history.

(56) References Cited

U.S. PATENT DOCUMENTS 10,904,920 B1 * 1/2021 Noh ............... H04W 76/15
2003/0186703 A1    10/2003 Cromer et al.
(Continued)

OTHER PUBLICATIONS

International Search Report and Written Opinion of the International Searching Authority for PCT International Application No. PCT/SE2018/050486 dated Feb. 11, 2019.
(Continued)

*Primary Examiner* — Syed Ali
(74) *Attorney, Agent, or Firm* — Sage Patent Group

(57) ABSTRACT

A method performed by a core network node for handling a data service session in a packet communication network is provided. The packet communication network is configured to support fixed access between a User Equipment (UE) and an access network node. The core network node obtains a decision whether a monitored bandwidth over the fixed access is below a bandwidth requirement authorized to the UE. The bandwidth over the fixed access is monitored for a data service session between the UE and the Data Network via the fixed access. The core network node obtains a decision of how to handle the data service session based on the decision whether the monitored bandwidth over the fixed access is below the bandwidth requirement.

16 Claims, 16 Drawing Sheets

(51) Int. Cl.
*H04W 28/02* (2009.01)
*H04W 28/22* (2009.01)
*H04W 28/24* (2009.01)

(56) References Cited

U.S. PATENT DOCUMENTS

| | | |
|---|---|---|
| 2004/0001467 A1 | 1/2004 | Cromer et al. |
| 2004/0033806 A1 | 2/2004 | Daniel et al. |
| 2006/0203773 A1* | 9/2006 | Georges ............... H04L 47/824 370/310.1 |
| 2007/0286213 A1 | 12/2007 | Fodor et al. |
| 2012/0020218 A1* | 1/2012 | Li ........................ H04L 43/067 370/235 |
| 2012/0147839 A1* | 6/2012 | Yin ....................... H04L 67/148 370/329 |
| 2012/0185906 A1* | 7/2012 | Doets ................. H04L 65/1069 725/126 |
| 2013/0051226 A1 | 2/2013 | Elefant et al. |
| 2014/0198644 A1 | 7/2014 | Basilier et al. |
| 2015/0074285 A1 | 3/2015 | Gahm et al. |
| 2016/0219489 A1 | 7/2016 | Ben Ami et al. |
| 2016/0285724 A1 | 9/2016 | Lundquist et al. |
| 2016/0381585 A1 | 12/2016 | Dudzinski et al. |
| 2018/0049069 A1 | 2/2018 | Yeddala et al. |
| 2018/0077023 A1 | 3/2018 | Zhang |
| 2021/0212083 A1* | 7/2021 | Jimenez Cordon ..... H04L 69/16 |

OTHER PUBLICATIONS

3GPP TS 23.502 V15.1.0, "3rd Generation Partnership Project; Technical Specification Group Services and System Aspects; Procedures for the 5G System; Stage 2 (Release 15)," Technical Specification, Mar. 2018, 285 pages.

3GPP TS 23.501 V15.1.0, "3rd Generation Partnership Project; Technical Specification Group Services and System Aspects; System Architecture for the 5G System; Stage 2, (Release 15)," Technical Specification, Mar. 2018, 201 pages.

* cited by examiner

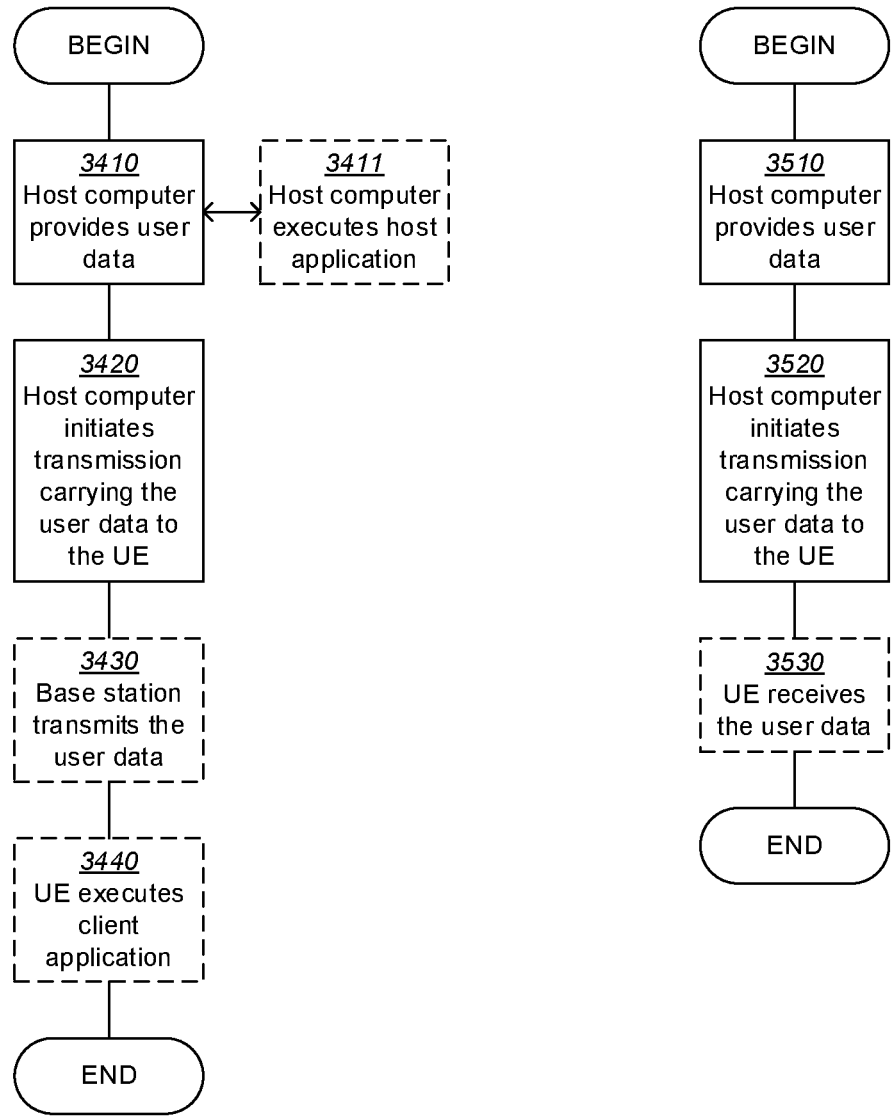

CORE NETWORK NODE, USER EQUIPMENT AND METHODS IN A PACKET COMMUNICATIONS NETWORK

CROSS REFERENCE TO RELATED APPLICATION

This application is a continuation of U.S. patent application Ser. No. 17/052,489 filed on Nov. 2, 2020, which is a 35 U.S.C. § 371 national stage application of PCT International Application No. PCT/SE2018/050486 filed on May 9, 2018, the disclosures and content of which are incorporated by reference herein in their entireties.

TECHNICAL FIELD

Embodiments herein relate to a core network node, a UE and methods therein. In particular, they relate to handling a data service session in a packet communication network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access network node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL). The wireless devices communicate to each other in SideLink (SL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) and to continuously evolve 4G. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of Things, aiming at lower cost, lower battery consumption and lower latency than 4G equipment.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

FIG. 1 and FIG. 2 show a summarization of the Quality of Service (QoS) model currently described in Technical Specification (TS) 23.501, TS 23.502 and TS 23.503.

FIG. 1 shows an overview of the 5G QoS for voice and video call. The NextGen Radio Access Network (NG-RAN) includes UE and NodeB (NB) and their radio interface comprising a number of radio bearers. The NG RAN is adjacent to User Plane Function (UPF) of the 5G Core Network (5GC) via an interface referred to as N3. A Protocol Data Unit (PDU) session comprises a number of QoS flows, where each ranges from the UE to the NB via one Radio bearer and further on from the NB to the UPF via an N3 tunnel.

A QoS flow is the finest granularity of QoS differentiation in a PDU session.

Each QoS flow is associated with QoS parameters that are used to enforce the correct traffic forwarding treatment.
Each packet belongs to a QoS flow.
For Voice/Video calls
   SIP signaling: 5QI=5
   Voice media: 5QI=1
   Video media: 5QI=2 or 7
One PDU session can carry one or several QoS flows.
   All QoS flows are sent over the same N3 tunnel.
A Radio Bearer can carry one or several QoS flows.
   Each PDU session has a unique set of Radio Bearers.
   RAN decide which Radio Bearer a QoS flow is sent over.
Note: Reflective QoS for uplink traffic is controlled on per-packet basis (UE "reflects" QoS of downlink traffic).
Not applicable for QoS flows for voice/video calls.
FIG. 2 depicts an overview on QoS related functionality.
In FIG. 2,
NG UE is the NextGen User Equipment,
AMF is the Access and Mobility Management Function,
AUSF is the Authentic Server Function,
UDM is the Unified Data Management,
SMF is the Session Management Function,
PCF is the Policy Control function, and
AF is the Application Function.
Further in FIG. 2,
N1 is the interface between the UE and the AMF,
N2 is the interface between the (R)AN and the AMF,
N3 is the interface between the (R)AN and the UPF,
N4 is the interface between the UPF and the SMF,
N5 is the interface between the PCF and the AF,
N6 is the interface between the UPF and the DN, N7 is the interface between the SMF and the PCF, N8 is the interface between the AMF and the UDM, N9 is the interface between the UPF and the UPF, N10 is the interface between the SMF and the UDM, N11 is the interface between the AMF and the SMF, N12 is the interface between the AMF and the AUSF, N13 is the interface between the AUSF and the UDM, N14 (Not shown) is the interface between the AMF and the AMF, and N15 is the interface between the AMF and the PCF.

Non-Standalone (NSA) 5G NR will utilize the existing LTE radio and core network as an anchor for mobility management and coverage while adding a new 5G carrier. In 3GPP terminology, this is NSA 5G NR deployment scenario which is referred to as Option 3.

Standalone (SA) 5G NR implies full user and control plane capability for 5G NR, utilizing the new 5G core network architecture also being done in 3GPP.

The usage monitoring function specified in 23.203 for Policy and Charging Control (PCC), the Policy and Charging Rules Function (PCRF) and the Policy Control Function (PCF) in 5G will count the volume that a user, e.g. a UE, has consumed. This may be done per service as well. The User Plane Function (UPF) in 5G or the Packet Gateway (PGW) in 4G are in charge of counting the volume of data and reporting to the PCF via the Session Management Function (SMF) in 5G or to the PCRF directly from the PGW in 4G.

NR in Option 3 is to report off line, the amount of data that has been handled by the NR when using dual connectivity. This is done to build a Call Detail Record (CDR).

SUMMARY

As a part of developing embodiments herein the inventors have identified a problem which first will be discussed.

3GPP release 16 will include support for fixed access into 5G System (5GS). While in a 3GPP access the actually used bandwidth over the radio is dependent on radio conditions, load, mobility etc., the 3GPP 5GS does not support reporting of bandwidth limitations.

In RAN the available bandwidth is dynamic and depends on several externally imposed elements like radio conditions, load mobility etc. Due to this, dynamically advanced functional elements are in place to measure and report to PCC the used volume so that the end customer such as e.g. a UE, is getting charged properly for the service that (s)he has subscribed for.

On the fixed side though, the available bandwidth is much more constant depending mainly on the type of access that is available and/or configured for the customer such as e.g. Digital Subscriber Line (DSL) line, Ethernet wire, optical fiber, etc. Well controlled and artificially imposed bandwidth limitations are in place in order to perform Traffic shaping, also known as packet shaping, Quality of Service (QoS) or bandwidth management. Traffic shaping is the manipulation and prioritization of network traffic to reduce the impact of heavy users or machines from effecting other users. This bandwidth throttling or rate limiting is performed to guarantee QoS and efficient use of bandwidth.

Specifically, traffic shaping is achieved by delaying the flow of certain packets and prioritizing the flow of other preferred streams by predetermined sets of constraints. The benefits of traffic shaping includes the prioritization of business-critical over non-critical traffic and the creation of tiered service levels.

The problem is that there are no means for the core network to be aware of the bandwidth that is currently available over the fixed access for a service and therefore the service contract according to the subscription may be failing to be fulfilled or that traffic shaping methods cannot be used efficiently in a packet network.

An object of embodiments herein is to improve the performance of a wireless communications network using fixed access.

According to a first aspect of embodiments herein, the object is achieved by a method performed by a core network node for handling a data service session in a packet communication network. The packet communication network is configured to support fixed access between a User Equipment, UE, and an access network node. The core network node obtains a decision whether a monitored bandwidth over the fixed access is below a bandwidth requirement authorized to the UE. The bandwidth over the fixed access is monitored for a data service session between the UE and the Data Network via the fixed access. The core network node obtains a decision of how to handle the data service session based on the decision whether the monitored bandwidth over the fixed access is below the bandwidth requirement.

According to a second aspect of embodiments herein, the object is achieved by a method performed by a User Equipment, UE, for assisting a core network node in handling a data service session in a packet communication network. The packet communication network is configured to support fixed access between the UE and an access network node. The UE monitors a bandwidth over the fixed access for a data service session between the UE and the Data Network via the fixed access. The UE decides whether the monitored bandwidth over the fixed access is below the bandwidth requirement authorized to the UE. The UE then assists the core network node in handling the data service session in the packet communication network by sending to the core network node, the decision whether the monitored bandwidth over the fixed access is below the bandwidth requirement authorized to the UE.

According to a third aspect of embodiments herein, the object is achieved by a core network node for handling a data service session in a packet communication network. The packet communication network is configured to support fixed access between a User Equipment, UE, and an access network node. The core network node further is configured to:

Obtain a decision whether a monitored bandwidth over the fixed access is below a bandwidth requirement authorized to the UE. The bandwidth over the fixed access is adapted to be monitored for a data service session between the UE and the Data Network via the fixed access.

Obtain a decision of how to handle the data service session based on the decision whether the monitored bandwidth over the fixed access is below the bandwidth requirement.

According to a fourth aspect of embodiments herein, the object is achieved by a User Equipment, UE, for assisting a core network node in handling a data service session in a packet communication network. The packet communication network is configured to support fixed access between the UE and an access network node. The UE further is configured to:

Monitor a bandwidth over the fixed access for a data service session between the UE and the Data Network via the fixed access.

Decide whether the monitored bandwidth over the fixed access is below the bandwidth requirement authorized to the UE.

Assist the core network node in handling the data service session in the packet communication network by sending to the core network node, the decision whether the monitored bandwidth over the fixed access is below the bandwidth requirement authorized to the UE.

Since the core network node obtains the decision whether the monitored bandwidth over the fixed access is below the bandwidth requirement authorized to the UE, it is capable of handling the data service session based on the actual bandwidth over the fixed access in relation to the bandwidth requirement authorized to the UE. This in turn results in a packet communication network achieving a more efficient usage of the total subscribed bandwidth. This is since the network is made aware of currently used bandwidth being below the subscribed bandwidth. Which in turn results in an improved performance of the packet communication network using fixed access.

BRIEF DESCRIPTION OF THE DRAWINGS

Examples of embodiments herein are described in more detail with reference to attached drawings in which:

FIGS. 15 to 18 are flowcharts illustrating methods implemented in a communication system including a host computer, a base station and a user equipment.

DETAILED DESCRIPTION

Figure 1:
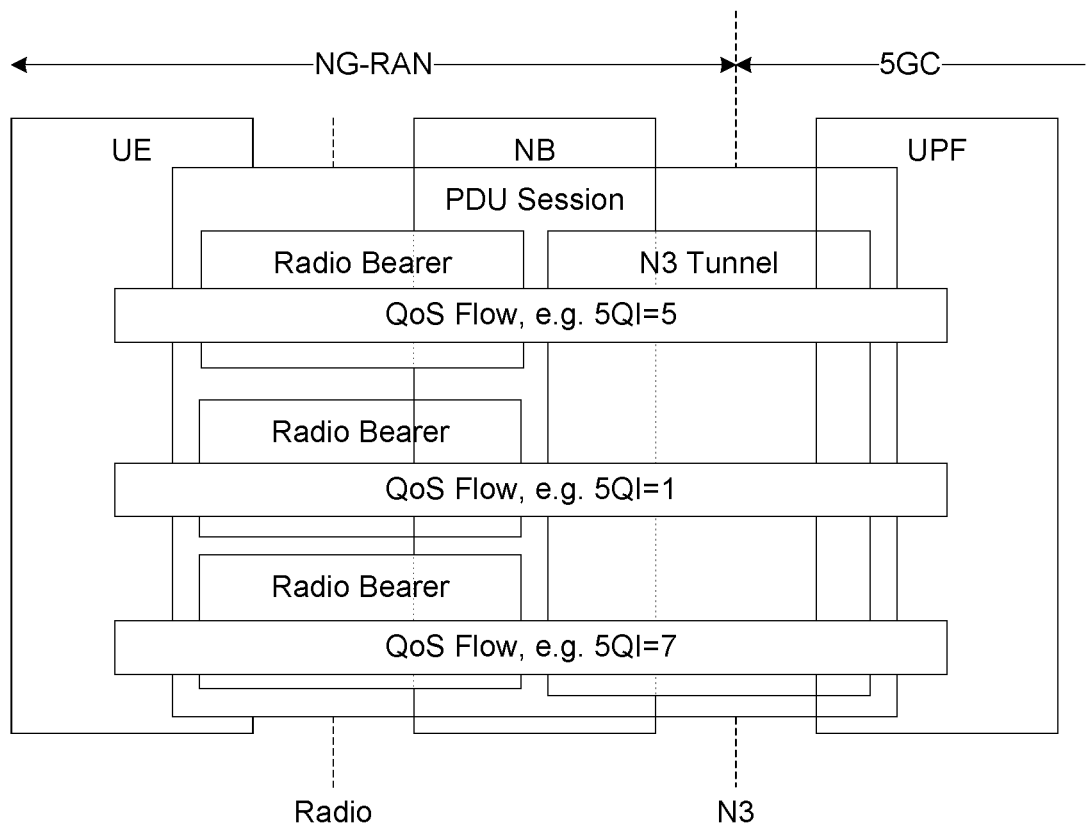
FIG. 1 is a schematic diagram illustrating prior art.
Figure 2:
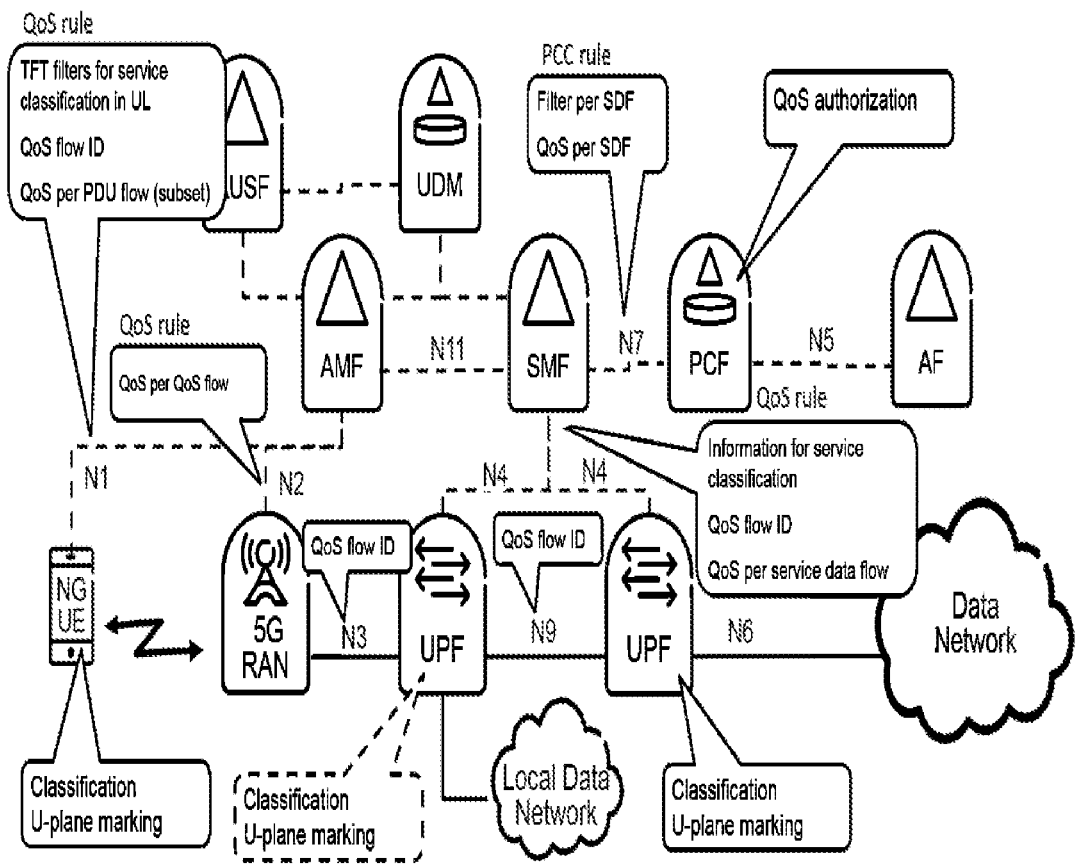
FIG. 2 is a schematic diagram illustrating prior art.

Example of embodiments herein relate to bandwidth requirements applied in 5G converged core network. The term converged core network when used herein means a core network that supports both wireless access and fixed access.

The 5GC is a converged core network, which both supports wireless access and fixed access like Ethernet or DSL. In 5GC, a subscriber may have a subscription provided by an operator for a certain UL and DL bit rate, also referred to as a bandwidth requirement authorized to the UE, for the fixed access, and possibly also for a wireless access. In such a scenario, examples of embodiments herein may be implemented.

According to example embodiments herein, the fixed access is between a UE and an access network node. Any of the UE and the access network node monitors the bandwidth over the fixed access. This is for a data service session between the UE and a Data Network via the fixed access e.g. for an Internet access, or any other connectivity.

Any of the UE and the access network node detects, also referred to as decides, that the monitored bandwidth over the fixed access is below a bandwidth requirement authorized to the UE. This is the bandwidth the UE subscribes for. This means that the UE does not get the required bandwidth it subscribes for.

This is then reported to the core network node, e.g. to its SMF.

Reporting of bandwidth limitation means that if a subscriber, for example a UE, e.g. has a 100 Mbit/s downlink speed subscribed for an Internet access, but only e.g. 10 Mbit/s can be provided over the fixed access, then this bandwidth limitation is reported for Internet access over the fixed access. Note that it is not the actual usage that is meant to be reported, i.e., whether e.g. 22 Mbyte of data have been send downlink in a particular period of time but the maximum Uplink (UL) and Downlink (DL).

The core network node may send the information to a PCF to in return get a decision from the PCF on how to handle the data service session between the UE and the Data Network via the fixed access. A PCF when used herein means a network function providing unified policy framework to govern network behavior and policy rules to Control Plane function(s) to enforce them, and in this particular case to decide on whether to release the data service session or to use available radio access network resources either by directly utilizing the attached RAN and/or by using radio based methods like Carrier Aggregation (CA) or Dual Connectivity (DC) to fulfill the bandwidth requirements.

This decision is based on that the monitored bandwidth over the fixed access is below the bandwidth requirement. The decision may e.g. be to release the data service session or to use radio access based methods to achieve this.

The PCC framework of the operator may provide to the (R)AN such as any of the UE and the access network node, the bandwidth requirement authorized to the UE, such as e.g. the maximum UL and DL bit rate to be provided for a service data flow of the UE over the fixed access.

A PCC when used herein means a set of network functions, including the PCF, that may apply policy and charging control per subscriber to any kind of access connected via the 5GC.

(R)AN functionality like CA—using e.g. NR on two frequency bands simultaneously, DC—using NR on one frequency band, and LTE on another frequency band simultaneously, traffic shaping on bandwidth throttling and/or rate limiting functions may be used in order to keep the user traffic of the UE at the UL and DL bandwidth requirement authorized to the UE.

The monitoring performed by the UE such as its Customer Premises Equipment (CPE), or the access network node such as e.g. its Access Gateway Function (AGF), relates to the actual bandwidth such as e.g. the actual UL and DL bit rate over the fixed access. This is to see whether the actual bandwidth is below the bandwidth requirement authorized to the UE.

An AGF when used herein means a function that is interfacing to the 5GC like an NodeB, i.e., with N2 and N3 and interfacing to the UE 120 via the fixed network. It relays the N1 interface between the UE and the AMF via N2.

Figure 3:
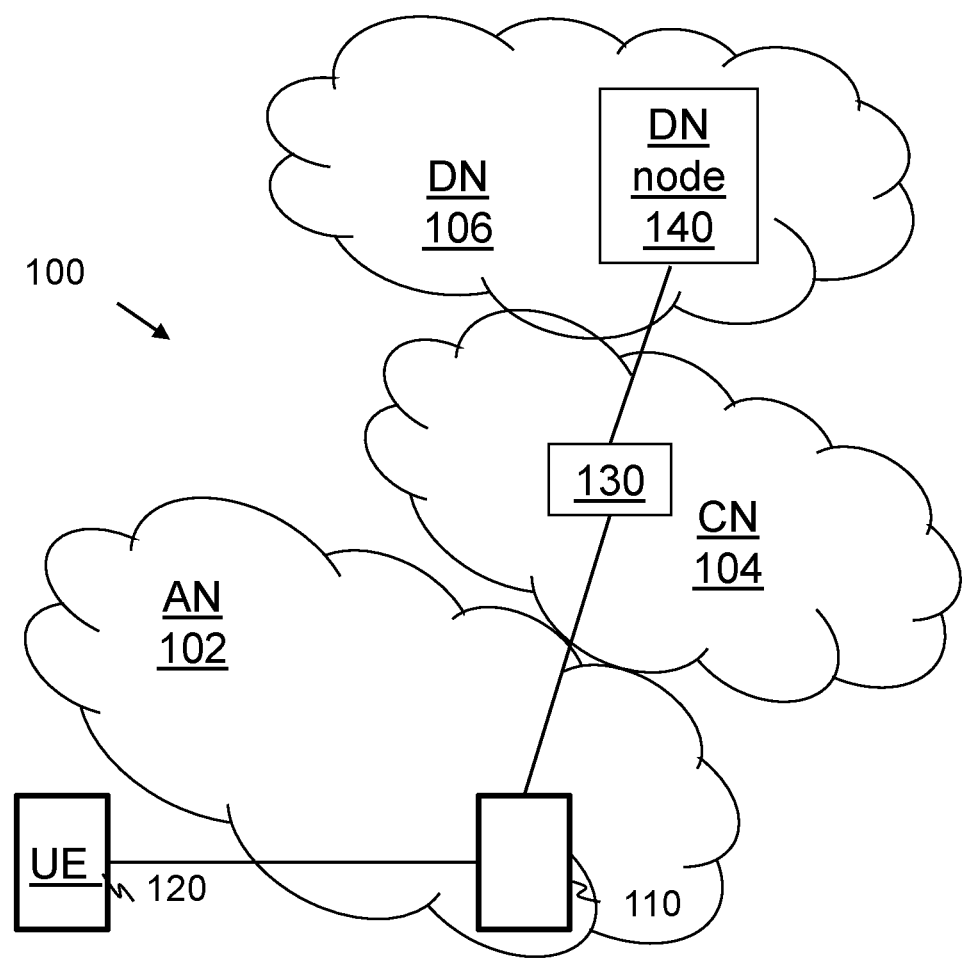
FIG. 3 is a schematic block diagram illustrating embodiments of a packet communications network.

FIG. 3 is a schematic overview depicting a packet communication network 100 wherein embodiments herein may be implemented. The packet communication network 100 comprises at least an Access Network (AN) 102 such as e.g. a RAN and a Core Network (CN) 104. The AN 102 and the CN may together be a converged network supporting both wireless access and fixed access. The packet communication network 100 may use 5G NR and may further use a number of other different technologies, such as, Wi-Fi, LTE, LTE-Advanced, just to mention a few possible implementations.

Access network nodes such as an access network node 110 operate in the packet communication network 100, providing fixed access and e.g. also wireless access for UEs e.g. to a Data Network (DN) 106 such as the Internet.

According to examples herein, the access network node 110 provides fixed access e.g. by means of e.g. Digital Subscriber Line (DSL) line, Ethernet wire, optical fiber, etc. to UEs such as the UE 120 described below. The access network node 110 may further provide wireless access for UEs. The access network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE with the fixed or wireless access.

The access network node 110 may be configured with functionality such as AGF.

A number of UEs, such as a UE 120, operate in the packet communication network 100. The UE 120 may be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the access network node 110, one or more Access Networks (AN) 102, e.g. RAN, to one or more core networks (CN) such as the CN 104. It should be understood by the skilled in the art that UE relates to a non-limiting term which means any UE, terminal, wireless communication terminal, user equipment, (D2D) terminal, or node e.g. smart phone, laptop, mobile phone, sensor, relay, mobile tablets or even a small base station.

The UE 120 may be configured with functionality such as Customer Premises Equipment (CPE).

The packet communication network 100 is configured to support fixed access between the UE 120 and the access network node 110.

A number of core network nodes and corresponding functionality operate in the CN 104 in the packet communication network 100, such as a core network node 130. The core network node 130 may be a 5G core network node. The core network node 130 may be configured with functionality such as SMF.

A number of data network nodes and corresponding functionality operate in the DN 106, such as a data network node 140. The data network node 140 may e.g. be node associated with an operator providing subscriptions to users such as a user of the UE 120.

The methods according to embodiments herein are performed by the core network node 130 and the UE 120.

As an alternative, a Distributed Node and functionality, e.g. comprised in a cloud may be used for performing or partly performing the methods. (not shown)

Some embodiments herein improve the current existing PCC functionality associated with fixed Access Network (AN) or cellular AN with additional elements related to fixed network operation, e.g. like traffic shaping on bandwidth throttling and/or rate limiting functions, and with reporting of UL and DL bandwidth over the (R)AN.

Figure 4:
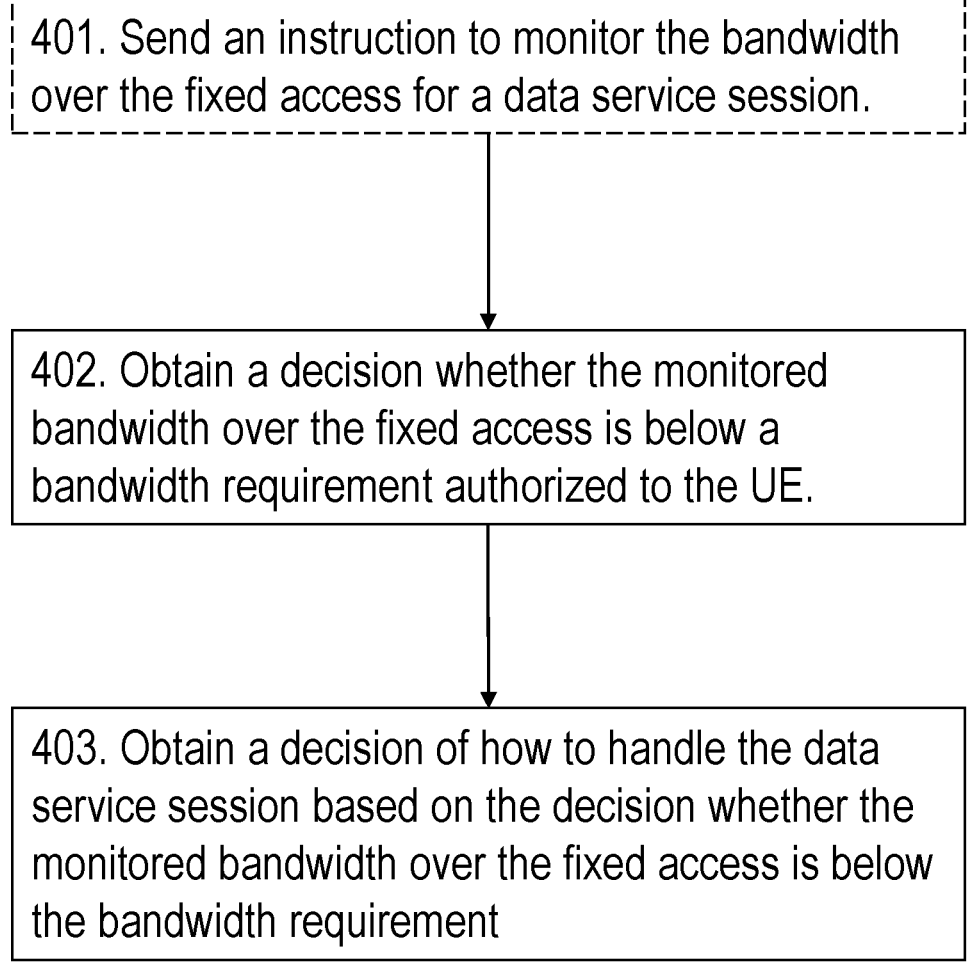
FIG. 4 is a flowchart depicting embodiments of a method in a core network node.

Example embodiments of a method performed by the core network node 130, e.g. by an SMF of the core network node 130, for handling a data service session in a packet communication network 100, will now be described with reference to a flowchart depicted in FIG. 4.

As mentioned above, the packet communication network 100 is configured to support fixed access between the UE 120 and the access network node 110. The fixed access may be between a CPE of the UE 120, and an AGF of the access network node 110.

The method comprises the following actions, which actions may be taken in any suitable order. Actions that are optional are presented in dashed boxes in FIG. 4.

Action 401

The core network node 130 want to find out whether the UE 120 really gets the bandwidth over the fixed access that the UE 120 is authorized to. The bandwidth the UE 120 is authorized to e.g. means the subscribed UL and DL bandwidth of the UE 120. In some embodiments, the core network node 130 may send an instruction to the UE 120 or the access network node 110 to monitor and report the actual bandwidth of the fixed access compared to the subscribed bandwidth.

Thus in some embodiments, the core network node 130 sends an instruction to any one out of the access network node 110 and the UE 120. The instruction comprises to monitor the bandwidth over the fixed access for the data service session, and to report to the core network node 130 when decided whether the monitored bandwidth over the fixed access is below the bandwidth requirement authorized to the UE 120. The instruction may be sent in a message such as a N2 PDU Session Request and RRC Connection Reconfiguration message.

Action 402

The UE 120 or the access network node 110 then monitors the bandwidth over the fixed access compared to the bandwidth the UE 120 is authorized to, and decides whether a monitored bandwidth over the fixed access is below a bandwidth requirement authorized to the UE 120. This is then reported to the core network node 130. The core network node 130 thus obtains a decision whether a monitored bandwidth over the fixed access is below a bandwidth requirement authorized to the UE 120. The bandwidth over the fixed access is monitored for a data service session between the UE 120 and the Data Network via the fixed access.

The decision may e.g. comprise that the monitored bandwidth over the fixed access is below the bandwidth requirement e.g. in average of the time period, or that the monitored bandwidth over the fixed access is not below the bandwidth requirement, e.g. in average of the time period. In some embodiments the decision may comprise how much below or above the bandwidth requirement the monitored bandwidth is, e.g. in average of the time period.

The bandwidth requirement may e.g. be represented by a Maximum Bit Rate (MBR).

The decision whether the monitored bandwidth over the fixed access is below the bandwidth requirement authorized to the UE 120, may be obtained from any one out of: The UE 120, a CPE related the UE 120, the access network node 110, and an AGF related to the access network node 110.

In some embodiments, the bandwidth over the fixed access for a data service session is monitored during one or more periods of time with intermediate time intervals. The information about the monitored bandwidth is in these embodiments obtained after a monitored period of time. This is to assure that the duration over which the bandwidth is calculated is handled by all the UEs or the access network in a standardized way which allows to achieve interoperability between UEs and access networks of different vendors.

A period of time may e.g. be during 30 seconds. An intermediate time interval may e.g. be 1 minute.

The period of time and the intermediate time interval may be provided to the UE 120 or the access network node 110 by the CN such as the core network node 130 or it may e.g. be a standardized value. The setting of the standardized value may be operator-customized. A parameter referred to as Averaging Window may be used and provided by the PCF in a PCC rule. As an alternative the setting of the standardized value may be standardized for standard 5G QoS Identifier (5QI) defined in the 3GPP TS 23.501 table 5.7.4-1. 5G QoS Identifier is a scalar that is used as a reference to a specific QoS forwarding behavior, e.g. packet loss rate, packet delay budget, to be provided to a 5G QoS Flow. This may be implemented in the access network by the 5QI referencing node specific parameters that control the QoS forwarding treatment, e.g. scheduling weights, admission thresholds, queue management thresholds, link layer protocol configuration, etc.

Action 403

The core network node 130 now knows whether a monitored bandwidth over the fixed access is below a bandwidth requirement authorized to the UE 120, but it further wishes to know how to handle the data service over the fixed access based on this knowledge. The core network node 130 therefore obtains a decision of how to handle the data service session based on the decision whether the monitored bandwidth over the fixed access is below the bandwidth requirement.

This may be performed by sending information about the obtained decision whether the monitored bandwidth over the fixed access is below the bandwidth requirement to a network node 140 comprising an AGF, e.g. a network node 140 of the operator providing the authorized bandwidth for the UE 120.

Thus the decision of how to handle the data service session based on the decision that the monitored bandwidth over the fixed access is below the bandwidth requirement, may be obtained by receiving it from a network node 140 comprising a PCF, after providing to said network node 140, the obtained information about the monitored bandwidth, and the decision whether the monitored bandwidth over the fixed access is below the bandwidth requirement authorized to the UE 120.

The decision of how to handle the data service session may relate to any one or more out of:

Whether or not to release the data service session. This may e.g. be the case when the service provided to the UE 120 is not acceptable if there is not enough bandwidth, e.g. the quality of experience for the UE 120 is not good enough to provide a service that demands certain amount of bandwidth.

Whether to expose an alarm. This may e.g. be the case when the service can be provided to the UE 120 even with lower bandwidth than the authorized, but the operator is warned about such a situation.

Whether to inform a backend charging system. This may e.g. be the case when this situation has to be considered for charging purposes, e.g. specific charging conditions may be applied.

Whether to adjust the bandwidth requirement in line with the monitored bandwidth. This may e.g. be the case when the UE 120, according to their subscription may be provided with a different bandwidth according to the situation in the access network.

Whether to use available radio access network resources by any one out of: directly utilizing an attached Radio Access Network, and by using radio based methods such as e.g. CA and DC, to fulfill the bandwidth requirements.

Figure 5:
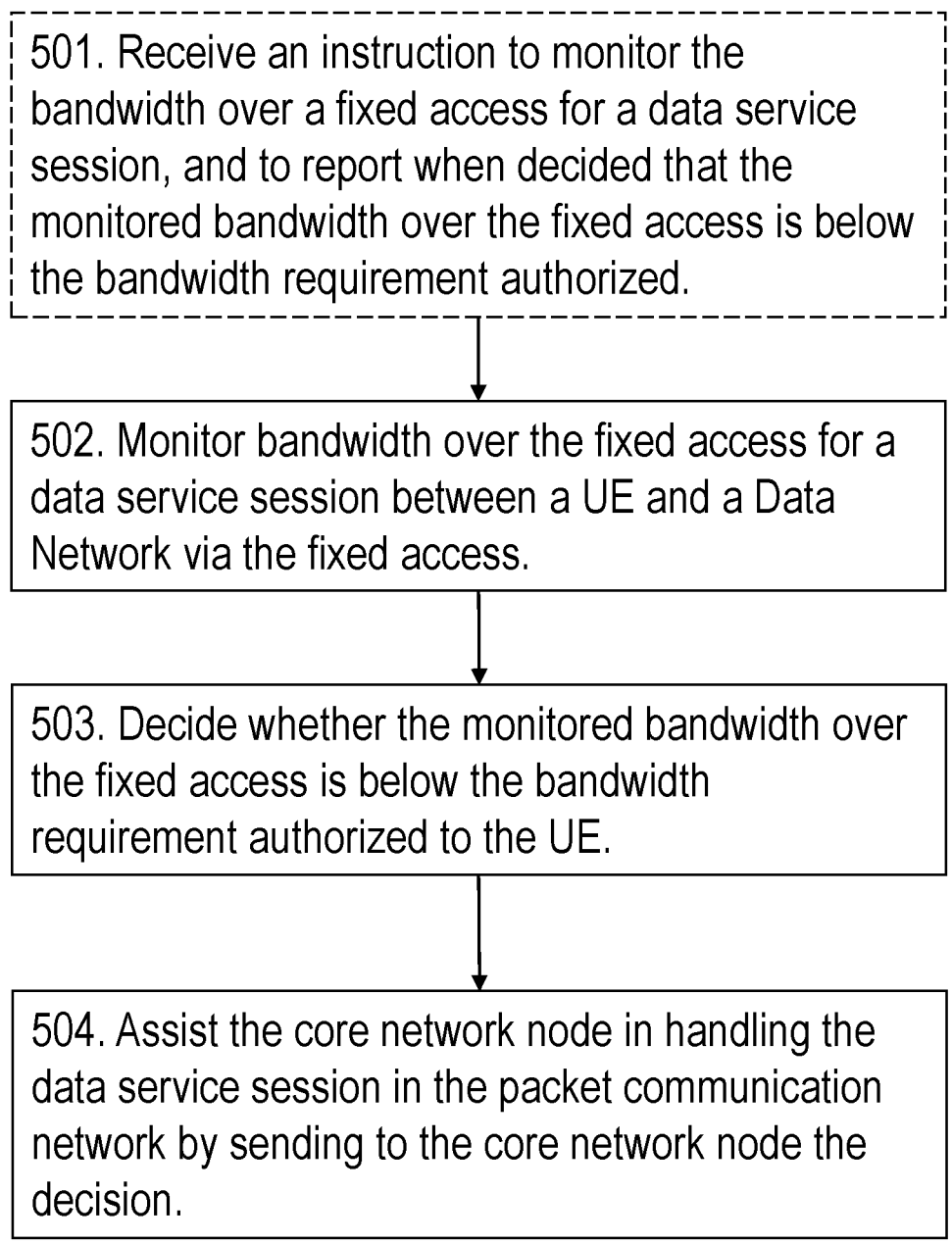
FIG. 5 is a flowchart depicting embodiments of a method in a UE.

Example embodiments of a method method performed by the UE 120 for assisting a core network node 130 in handling a data service session in a packet communication network 100 will now be described with reference to a flowchart depicted in FIG. 5. As mentioned above, the packet communication network 100 is configured to support fixed access between the UE 120 and the access network node 110. The fixed access may be between a Customer Premises Equipment (CPE) of the UE 120, and an Access Gateway Function (AGF) of the access network node 110. The method may be performed by the CPE related to the UE 120. It should be noted this method performed that the UE also may be performed by the access network node, in that case the UE 120 performing the below actions 501-504, may be represented by the access network node 110 performing the actions 501-504.

The method comprises the following actions, which actions may be taken in any suitable order. Actions that are optional are presented in dashed boxes in FIG. 5.

Action 501

In some embodiments, the UE 120 receives an instruction from the core network node 130. The instruction comprises to monitor the bandwidth over the fixed access for the data service session, and to report to the core network node 130 when decided whether the monitored bandwidth over the fixed access is below the bandwidth requirement authorized to the UE 120.

Action 502

The UE 120 monitors bandwidth over the fixed access for a data service session between the UE 120 and the Data Network via the fixed access. This may be performed by tracking in the UE 120, the amount of data that is delivered to the network and received from the network when the UE 120 is requesting service. This may be done in the UE 120 during a period of time indicated by the network such as the network node 140. This may be performed by a CPE related the UE 120.

In some embodiments, the bandwidth over the fixed access for a data service session is monitored during one or more periods of time with intermediate time intervals.

Action 503

The UE 120 decides whether the monitored bandwidth over the fixed access is below the bandwidth requirement authorized to the UE 120. This may be performed by checking when the effective bandwidth obtained when the UE 120 is requesting service from the network is below the bandwidth authorized by the network.

As mentioned above, the decision may e.g. comprise that the monitored bandwidth over the fixed access is below the bandwidth requirement e.g. in average of the time period, or that the monitored bandwidth over the fixed access is not below the bandwidth requirement, e.g. in average of the time period. In some embodiments the decision may comprise how much below or above the bandwidth requirement the monitored bandwidth is, e.g. in average of the time period.

This action may be performed by a CPE related the UE 120.

The bandwidth requirement may be represented by an MBR.

In some embodiments as mentioned above, the bandwidth over the fixed access for a data service session has been monitored during one or more periods of time with intermediate time intervals. In these embodiments, the decision of whether the monitored bandwidth over the fixed access is below the bandwidth requirement authorized to the UE 120 is performed after a monitored period of time.

Action 504

The UE 120 assists the core network node 130 in handling the data service session in the packet communication network 100 by sending to the core network node 130, the decision whether the monitored bandwidth over the fixed access is below the bandwidth requirement authorized to the UE 120.

The assisting of the core network node 130 in how to handle the data service session comprises any one or more out of: Whether or not to release the data service session, whether to expose an alarm, whether to inform a backend charging system, and whether to adjust the bandwidth requirement in line with the monitored bandwidth.

Embodiments herein described above, will no further be explained and exemplified.

Figure 6:
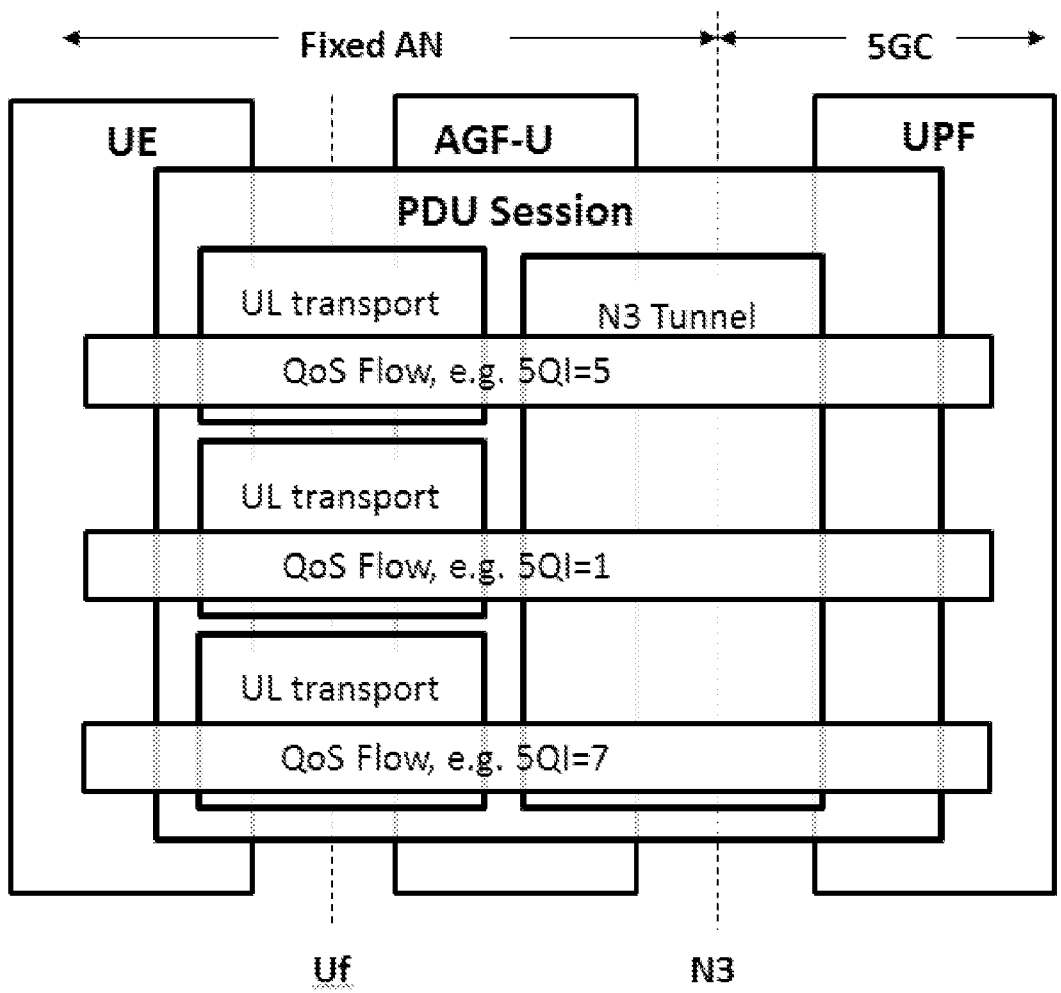
FIG. 6 is a schematic block diagram illustrating embodiments herein.

FIG. 6 depicts an overview of 5G QoS for fixed access wherein embodiments herein may be implemented. The fixed access is between the UE 120 and the access network node 110, e.g. its AGF-User Plane (U) and their radio interface comprising a number of radio bearers. The fixed access is adjacent to UPF of the 5GC via an interface referred to as N3. A Protocol Data Unit (PDU) session comprises a number of QoS flows, where each ranges from the UE 120 to the access network node 110, e.g. its AGF-U via one Radio bearer and further on from the access network node 110, e.g. its AGF-U to the UPF via an N3 tunnel.

A QoS flow is the finest granularity of QoS differentiation in a PDU session.
  Each QoS flow is associated with QoS parameters that are used to enforce the correct traffic forwarding treatment.
  Each packet belongs to a QoS flow.
  For Voice/Video calls
    SIP signaling: 5QI=5
    Voice media: 5QI=1
    Video media: 5QI=2 or 7
  One PDU session can carry one or several QoS flows.
    All QoS flows are sent over the same N3 tunnel.
  QoS flows are transported via Uf; QoS (QFI) is mapped to IP (DiffServ) and to Ethernet transport over the fixed AN.

In FIG. 6, it can be seen that the user plane traffic for a PDU session may be conveyed in different QoS flows, each one providing specific QoS characteristics.

Figure 7:
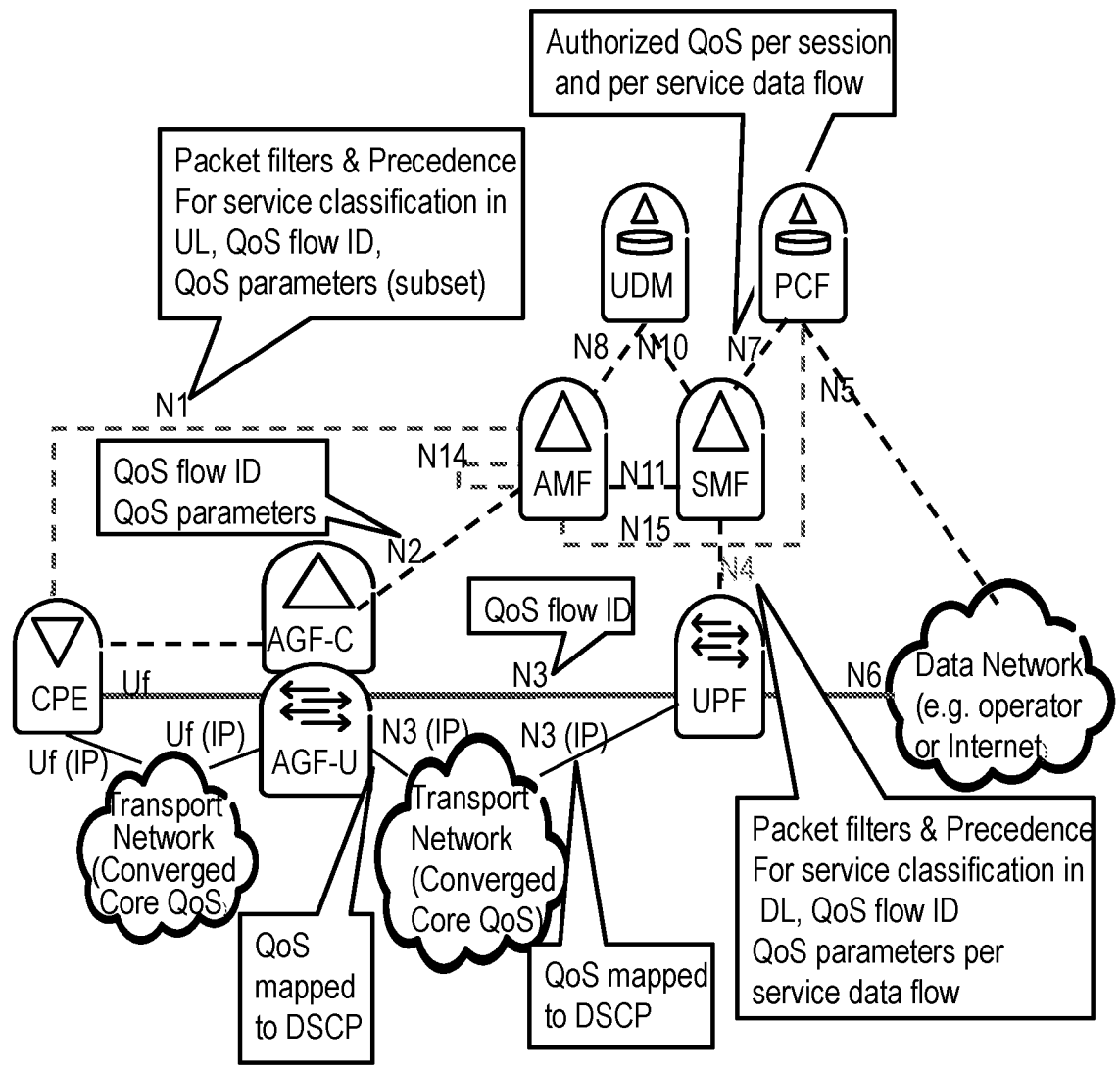
FIG. 7 is a schematic block diagram illustrating embodiments of a packet communications network.

FIG. 7 depicts an overview of the architecture of 5G QoS for fixed access wherein embodiments herein may be implemented. In FIG. 7,
  CPE is the Customer Premises Equipment,
  AGF-C is a 5G Access Gateway Function Control Plane,
  AGF-U is a 5G Access Gateway Function User Plane,
  DSCP is a Differentiated Services Code Point,
  AMF is an Access and Mobility Management Function,
  SMF is a Session Management Function,
  UDM is a Unified Data Management, and
  PCF is the Policy Control Function.

In FIG. 7, it can be seen that the PCF provides the authorized QoS for the session, e.g. as Session AMBR, and for the service data flows, as per information provided in the PCC rules, to the SMF. The SMF provides the QoS information to the different enforcement points, i.e the UPF using the N4 reference point, and, via the AMF, to the access network, N2 reference point, and the UE, N1 reference point.

The PCC rules may authorize QoS per service data flow and per session, and they may include per service data flow, also maximum UL and DL bit rate, also referred to as the bandwidth requirement authorized to the UE 120, to be provided for service data flow for a data network access such as the Internet access. This maximum bit rate may also be sent to the network node 110, e.g. to its AGF and to the UE 120, e.g. to its CPE.

Any of the UE 120 as in embodiment 1 below and the access network node 110 as in embodiment 2 below may monitor the fixed access.

Embodiment 1

The UE 120, e.g. its CPE monitors the UL and DL bit rate over the fixed access. I.e. the UE 120 monitors the actual bandwidth over the fixed access, e.g. over a predefined or configured time period.

The UE 120, e.g. its CPE monitors configured bandwidth limits by using bandwidth related tools developed on fixed access networks but reports those limits to the PCF by using and enhancing the methods for PCC functionality and architecture that have been developed by 3GPP After each monitoring period, or if only a lower bit rate can be provided than the subscribed one then the UE 120, e.g. its CPE informs the access network node 110 e.g. its AGF about the monitored UL and DL bit rate, which in turn informs the AMF. The AMF provides this information to SMF which in turn may provide this information to PCF.

The UE 120, e.g. its CPE, thus decides whether the monitored bandwidth over the fixed access is below the bandwidth requirement authorized to the UE 120, and sends via the access network node 110 e.g. its AGF to the core network node 130, e.g. its SMF, the decision that the monitored bandwidth over the fixed access is below the bandwidth requirement authorized to the UE 120. The core network node 130, e.g. its SMF then obtains e.g. from the PCF on request, a decision of how to handle the data service session based on the decision that the monitored bandwidth over the fixed access is below the bandwidth requirement.

Embodiment 2

Like embodiment 1, but the access network node 110 e.g. its AGF monitors the maximum UL and DL bit rate over the fixed access that is carried by the AGF-User Plane.

The access network node 110 e.g. its AGF monitors the UL and DL bit rate over the fixed access. I.e. the network node 110 monitors the actual bandwidth over the fixed access, e.g. over a predefined or configured time period.

After each monitoring period, if only a lower bit rate can be provided than the subscribed one, then the access network node 110 e.g. its AGF informs the AMF about the monitored UL and DL bit rate. The AMF provides this information to the core network node 130 e.g. its SMF which in turn may provide this information to the PCF.

The access network node 110 e.g. its AGF, thus decides whether the monitored bandwidth over the fixed access is below the bandwidth requirement authorized to the UE 120, and sends to the core network node 130, e.g. its SMF, via the AMF, the decision that the monitored bandwidth over the fixed access is below the bandwidth requirement authorized to the UE 120. The core network node 130, e.g. its SMF then obtains e.g. from the PCF on request, a decision of how to handle the data service session based on the decision that the monitored bandwidth over the fixed access is below the bandwidth requirement.

The decision that the monitored bandwidth over the fixed access is below a bandwidth requirement authorized to the UE 120, is in embodiment 1, sent from UE 120 e.g. its CPE to the access network node 110 e.g. its AGF and from the access network node 110 e.g. its AGF to AMF, or is in embodiment 2 sent from the access network node 110 e.g. its AGF and from the access network node 110 e.g. its AGF to AMF, by using N1 signalling, in embodiment 1, or N2 signalling, in embodiment 2:

It should be noted that the UPF may only monitor the actual used UL and DL bit rate over the QoS flow for the Internet access but it does not know whether there is a bandwidth limitation in the fixed access.

Figure 8:
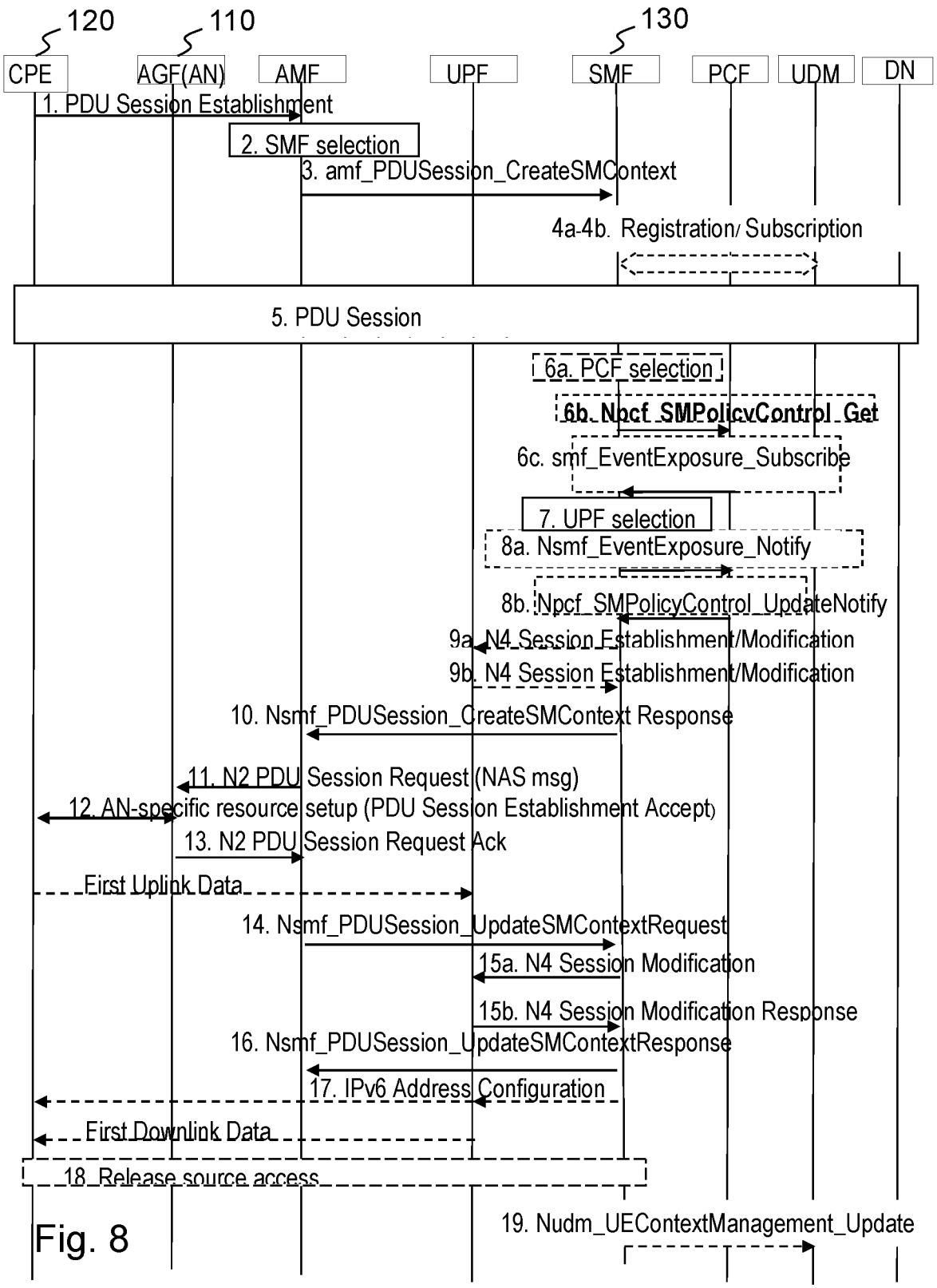
FIG. 8 is a signaling diagram illustrating embodiments herein.

FIG. 8 shows an embodiment implemented in the procedure to establish a PDU session to the 5GC through the fixed access. In this scenario, the CPE implements the N1 protocol to the AMF, similar to the UE in the 3GPP access, and the AGF implements the N2 procedure to the AMF and the N3 to the UPF, similar to the Radio access network when using the wireless access.

In FIG. 8, The UE 120 is represented by its CPE, the access network node 110 is represented by its AGF(AN), and the core network node 130 is represented by its SMF.

The procedure comprises the following actions, wherein the example embodiment is implemented in action 6b, action 10, action 11, which are underlined.

In action 1, the UE 120 such as its CPE, initiates the UE Requested PDU Session establishment procedure by the transmission of a NAS message comprising a PDU Session Establishment Request within the N1 SM container to the AMF.

In action 2, the AMF determines that the message corresponds to a request for a new PDU session if the Request Type indicates "initial request" and the PDU session ID is free, i.e. not already in use for an existing PDU session(s) of the UE.

In action 3, the AMF forwards, to the core network node 130 such as its SMF, the PDU session ID together with the N1 SM container containing the PDU Session Establishment Request received from the UE 120, e.g. the CPE, in action 1. The AMF ID uniquely identifies the AMF serving the CPE.

Thus, from the AMF to the core network node 130, such as its SMF, is forwarded: Nsmf_PDUSession_CreateSMRequest (SUPI, DNN, S-NSSAI, PDU Session ID, AMF ID, Request Type, N1 SM container (PDU Session Establishment Request), User location information, Access Type, PEI).

In action 4, if the core network node 130 such as its SMF has not yet registered and subscription data is unavailable, then the SMF registers with the UDM, retrieves subscription data and subscribes to be notified when subscription data is modified.

In action 5, if the SMF needs to perform secondary authorization/authentication during the establishment of the PDU Session by a DN-AAA server, this is done from SMF to DN via UPF.

In action 6a, If dynamic PCC is deployed, the SMF performs PCF selection. If dynamic PCC is not deployed, the SMF may apply a local policy.

In action 6b, the core network node 130 such as its SMF may invoke the Npcf_SMPolicyControl_Get operation to establish a PDU Session with the PCF and get the default PCC Rules for the PDU Session.

According to embodiments herein, the PCF may provide the corresponding authorized QoS for the session and the PCC rules with the corresponding QoS information applicable. The bandwidth requirement, e.g. the Maximum Bit Rate (MBR) that is required for the session, Session AMBR) and for the services (MBR indicated in the PCC rule, are part of the information related to the QoS. Additionally, the PCF may include in the PCC rules an indication to be notified when the maximum bit rate that can be provided for a service in the access network is below the MBR. This is related to action 501 described above.

In action 6c, The PCF subscribes to the IP allocation/release event in the SMF, the PCF may subscribe to other events as well, by invoking the Nsmf_EventExposure_Subscribe operation.

It is worth noting that the purpose of action 6 is to receive PCC rules before selecting UPF. If PCC rules are not needed as input for UPF selection, action 6 can be skipped.

In action 7, if the Request Type in action 3 indicates "Initial request", the SMF selects an SSC mode for the PDU Session. If action 5 is not performed, the SMF also selects an UPF. Furthermore, the SMF allocates an IP address/prefix for the PDU Session.

In action 8a, the SMF may invoke the Nsmf_EventExposure_Notify service operation to report some event to the PCF that has previously subscribed to the SMF. If Request Type is "initial request" and dynamic PCC is deployed and PDU Type is IPv4 or IPv6, SMF notifies the PCF (that has previously subscribed to the SMF) with the allocated CPE IP address/prefix.

In action 8b, the PCF may provide updated policies to the SMF by invoking the Npcf_SMPolicyControl_UpdateNotify service operation.

In action 9, if Request Type indicates "initial request" and action 5 was not performed, the SMF initiates an N4 Session Establishment procedure with the selected UPF, otherwise it initiates an N4 Session Modification procedure with the selected UPF. This may be done by performing actions 9a and 9b below.

In action 9a, the SMF sends an N4 Session Establishment/Modification Request to the UPF and provides Packet detection, enforcement and reporting rules to be installed on the UPF for this PDU Session. If CN Tunnel Info is allocated by the SMF, the CN Tunnel Info is provided to UPF in this step.

In action 9b, the UPF acknowledges by sending an N4 Session Establishment/Modification Response. If CN Tunnel Info is allocated by the UPF, the CN Tunnel Info is provided to SMF in this action.

In action 10, the core network node 130 such as its SMF sends to the AMF: Nsmf_PDUSession_CreateSM Response (Cause, N2 SM information (PDU Session ID, QoS Profile(s), CN Tunnel Info, S-NSSAI, Session-AMBR), N1

SM container (PDU Session Establishment Accept (QoS Rule, SSC mode, S-NSSAI, allocated IPv4 address, Session-AMBR))).

According to embodiments herein, in this action, the core network node 130 such as its SMF may provide the AMF with Session-AMBR and with the QoS rules applicable to the services, e.g. the bandwidth requirement, as expressed by the MBR. The QoS rule may include the indication to notify to the network when the maximum bit rate that can be provided for a service in the access network is below the MBR. This is related to action 503 above.

In action 11, the AMF sends the NAS message containing PDU Session ID and PDU Session Establishment Accept targeted to the CPE and the N2 SM information received from the SMF within the N2 PDU Session Request to the access network node 110 such as its AGF.

Thus, from AMF to the AGF: N2 PDU Session Request (N2 SM information, NAS message (PDU Session ID, N1 SM container (PDU Session Establishment Accept))).

According to embodiments herein, at this action, the AMF may provide the access network node 110 such as its AGF with Session-AMBR and with the QoS profile applicable to each QoS flow, identified by the QFI. The QoS profile may be extended with the indication to notify to the network when the monitored bandwidth, e.g. the maximum bit rate that may be provided for a QoS flow or the session in the access network is below the MBR. This is related to action 501 above The access network node 110 such as its AGF may monitor the UL and DL bit rate over the fixed access and according to some embodiments, if only a lower bit rate can be provided than the subscribed one, then the access network node 110 such as its AGF may inform the Core network node 130, e.g. via AMF, about the monitored UL and DL bit rate. This is embodiment 2 explained above.

In action 12, (AGF to CPE) The AGF may issue AN specific signalling exchange with the CPE that is related to the information received from SMF. For example, in case of a 3GPP RAN, an RRC Connection Reconfiguration may take place with the CPE establishing the necessary RAN resources related to the QoS Rules for the PDU Session request received in action 10.

According to embodiments herein, at this action, the network node such as its AGF may provide the UE 120 such as its CPE with Session-AMBR and with the QoS profile applicable to each QoS flow, identified by the QFI. The QoS profile may be extended with the indication to notify to the network when the maximum bit rate, also referred to as the bandwidth requirements, that can be provided for a QoS flow or the session in the access network is below the MBR. This is related to action 501 above. In such a case, the UE 120 such as its CPE will monitor the UL and DL bit rate over the fixed access and according to some embodiments, if only a lower bit rate can be provided than the subscribed one, then the UE 120 such as its CPE informs the network node 110 such as its AGF about the monitored UL and DL bit rate. This is embodiment 1 explained above.

The network node 110 such as its AGF may also allocate AGF N3 tunnel information for the PDU Session. In case of Dual Connectivity, the Master RAN node may assign some (zero or more) QFIs to be setup to a Master RAN node and others to Secondary RAN node. The RAN tunnel information includes a tunnel endpoint for each involved RAN node, and the QFIs assigned to each tunnel endpoint. A QFI can be assigned to either the Master RAN node or the Secondary RAN node and not to both.

The network node 110 such as its AGF forwards the NAS message (PDU Session ID, N1 SM container (PDU Session Establishment Accept)) provided in action 10 to the CPE. AGF shall only provide the NAS message to the CPE if the necessary RAN resources are established and the allocation of AGF tunnel information are successful.

In action 13, The network node 110 such as its AGF sends to the AMF: N2 PDU Session Response (PDU Session ID, Cause, N2 SM information (PDU Session ID, AGF Tunnel Info, List of accepted/rejected QoS profile(s))).

The AGF Tunnel Info corresponds to the Access Network address of the N3 tunnel corresponding to the PDU Session.

In action 14, the AMF forwards the N2 SM information received from the network node 110 such as its AGF to the SMF.

Thus, the AMF sends to the SMF: Nsmf_PDUSession_UpdateSMContext Request (N2 SM information).

In action 15a, if the N4 session for this PDU Session was not established already, the SMF initiates an N4 Session Establishment procedure with the UPF. Otherwise, the SMF initiates an N4 Session Modification procedure with the UPF. The SMF provides AN Tunnel Info and CN Tunnel Info. The CN Tunnel Info only needs to be provided if the SMF selected CN Tunnel Info in action 8 above.

It is worth nothing that if the PDU Session Establishment Request was due to mobility between 3GPP and non-3GPP access, the downlink data path is switched towards the target access in this action.

In action 15b, the UPF provides a N4 Session Establishment/Modification Response to the SMF.

In action 16, the SMF sends to the AMF: Nsmf_PDUSession_UpdateSMContext Response (Cause).

After this step, the AMF will forward relevant events to the SMF, e.g. at handover where the AGF Tunnel Info changes or the AMF is relocated.

In action 17, in case of PDU Type IPv6, the SMF generates an IPv6 Router Advertisement and sends it to the CPE via N4 and the UPF. Thus, the IPv6 Router Advertisement is sent to the CPE via the UPF.

In action 18, If the PDU Session Establishment request is due to a handover between 3GPP access and non-3GPP access, i.e. the Request type is set to "existing PDU Session", the SMF releases the user-plane over the source access (3GPP or non-3GPP access).

In action 19, if the SMF identity is not included in the DNN subscription context, i.e. either stored already in SMF if it was previously registered or provided in action 4a-4b by the UDM, then the SMF invokes the Nudm_UEContextManagement_Update service operation including the SMF address, the DNN and the PDU Session Id. The UDM stores the SMF identity, SMF address and the associated DNN and PDU Session Id.

Figure 9:
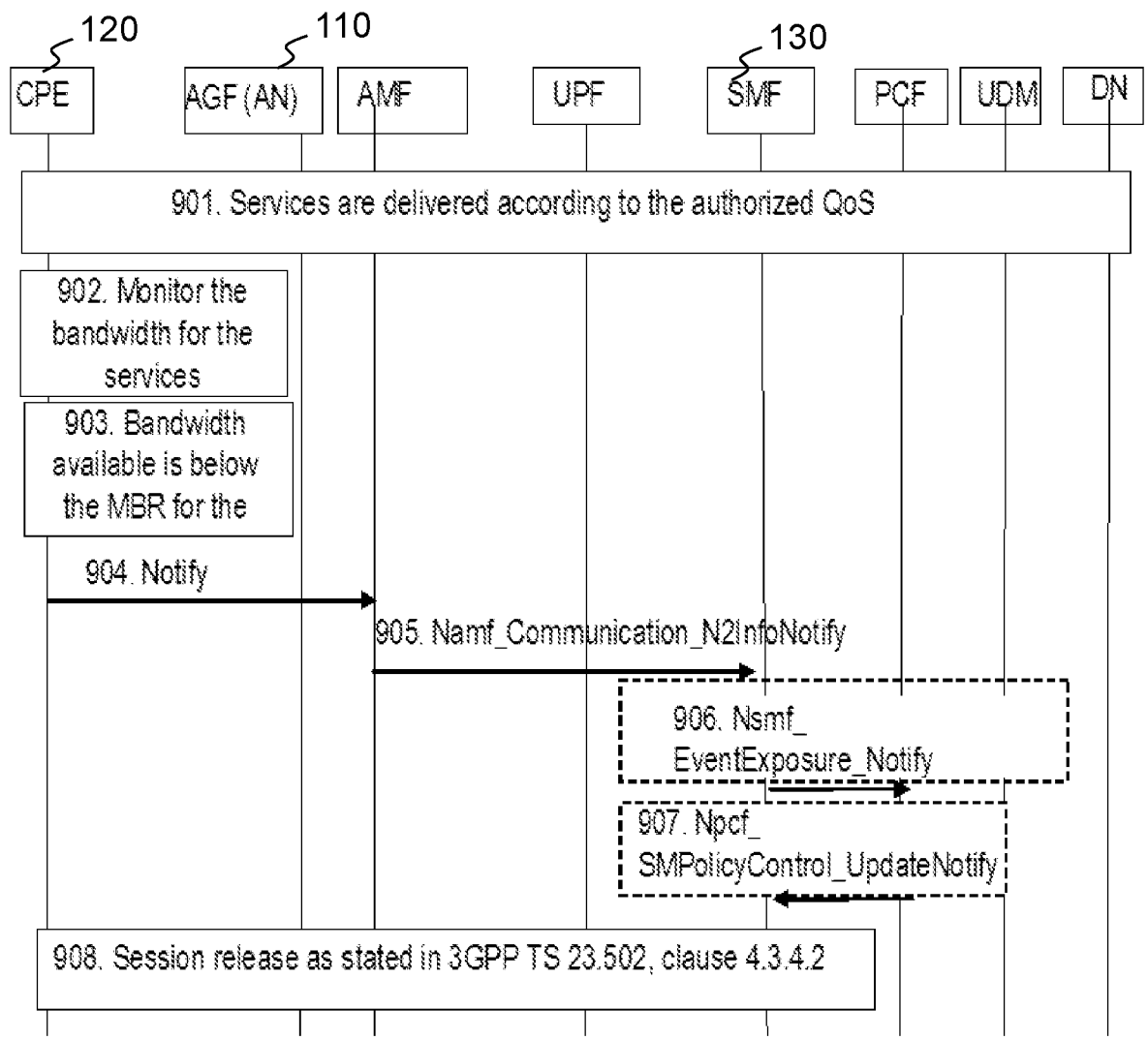
FIG. 9 is a signaling diagram illustrating embodiments herein.

FIG. 9 depicts a sequence diagram according to embodiment 1 illustrating an example scenario of how the bandwidth is monitored by the CPE of the UE 120 and reported via AGF of the access network node 110, the AMF and the SMF of the core network node 130 to the PCF when the PCF requested so and the monitored bandwidth is below the MBR provided by the PCF for a service.

Action 901. Data traffic such as the data service session is delivered according to requested QoS.

Action 902. According to embodiment 1, the CPE which in this example is the CPE of the UE 120, monitors the bandwidth provided for the data service session.

Action 903. The CPE detects that the bandwidth is below the MBR authorized to the UE by the packet communication network.

Action 904. The CPE notifies to an AMF that the bandwidth is below the MBR.

Action 905. The AMF forwards the notification to the SMF, which in this example is the SMF of the core network node 130, by using Namf_Communication_N1MessageNotify operation.

Action 906. The SMF forwards the notification to the PCF.

Action 907. The PCF receives the notification, and makes a decision based on the notification and e.g. operator policies, e.g. decides to release the PDU session, expose an alarm, to inform an application function, or to update the PCC rules to correspond to a Bandwidth (BW) requirement that is more in-line with the available bandwidth by adjusting the BW requirement to the situation, e.g. lower the BW required for the service.

Action 908. In this example, the data service session is released, since the PCF decides that the service that can be provided to the UE 120 is not appropriated if there is limited bandwidth available in the access network. See e.g. as explained in 3GPP TS 23.502, clause 4.3.4.2 from step 1b onwards.

Figure 10:
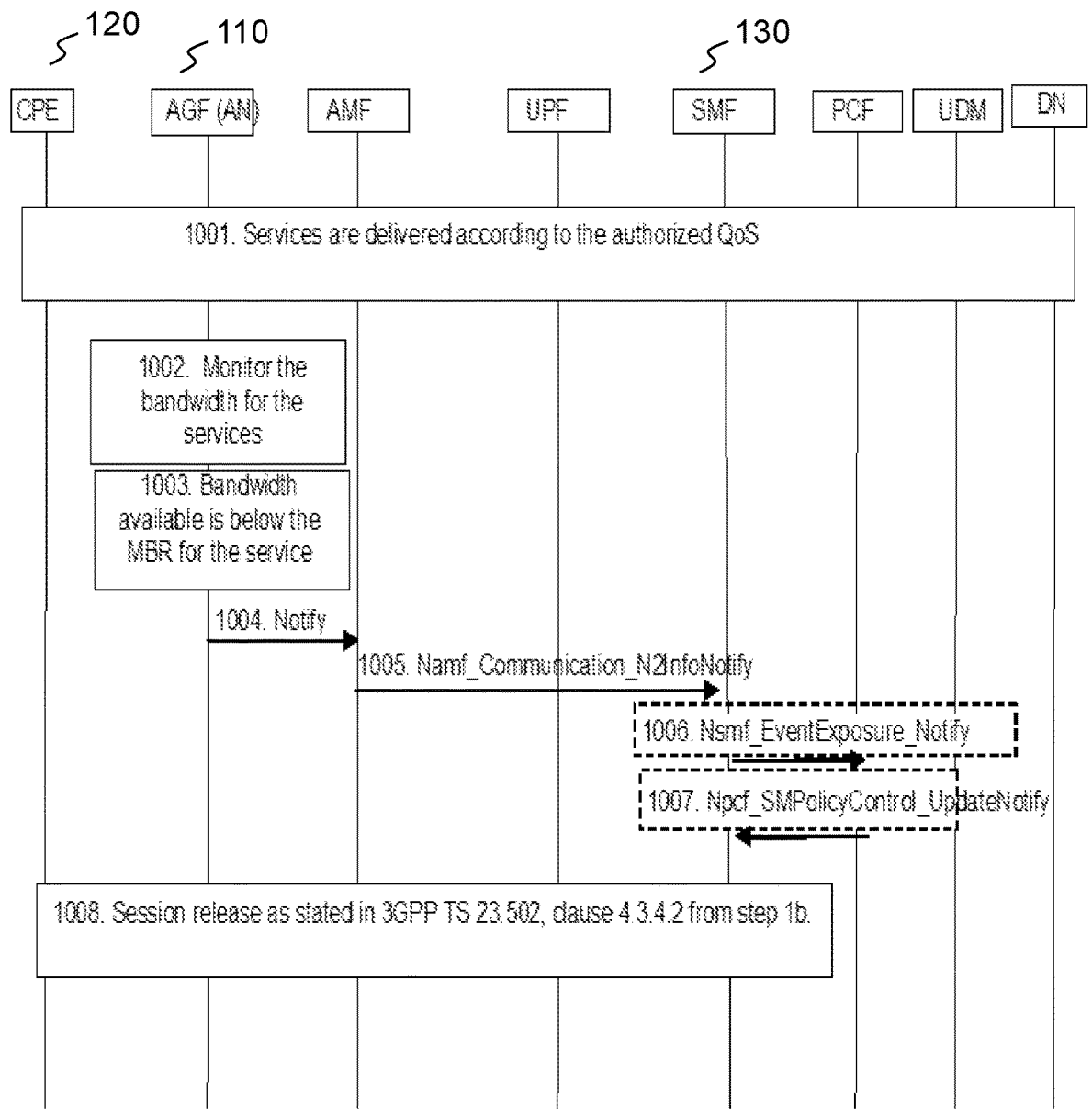
FIG. 10 is a signaling diagram illustrating embodiments herein.

FIG. 10 depicts a sequence diagram according to embodiment 2 illustrating an example scenario of how the bandwidth is monitored by the AGF, which in this example is the AGF of the access network node 110, and reported via the AMF and, SMF, which in this example is the SMF of the core network node 130 to the PCF when the PCF requested so and the monitored bandwidth is below the MBR provided by the PCF for a service.

Action 1001. Data traffic such as the data service session is delivered according to requested QoS.

Action 1002. In embodiment 2, the AGF monitors the bandwidth provided for the data service session.

Action 1003. The AGF detects that the bandwidth is below the MBR authorized to the UE 120 by the packet communication network.

Action 1004. The AGF notifies to the AMF that the bandwidth is below the MBR.

Action 1005. The AMF forwards the notification to the SMF, which in this example is the SMF of the core network node 130, Action 1006. The SMF forwards the notification to the PCF Action 1007. The PCF receives the notification, and makes a decision based on the notification and e.g. operator policies, e.g. decides to release the PDU session, expose an alarm, to inform an application function, or to update the PCC rules to correspond to a Bandwidth (BW) requirement that is more in-line with the available bandwidth by adjusting the BW requirement to the situation, e.g. lower the BW required for the service.

Action 1008. In this example, the data service session is released, since the PCF decides that the service that can be provided to the UE 120 is not appropriated if there is limited bandwidth available in the access network. See e.g. as explained in 3GPP TS 23.502, clause 4.3.4.2 from step 1b onwards To perform the method actions above for handling a data service session in a packet communication network 100 configured to support fixed access between a User Equipment 120 and an access network node 110, the core network node 130 may comprise the arrangement depicted in FIGS. 11a and 11b.

In some embodiments, the fixed access is arranged to be between a Customer Premises Equipment of the UE 120, and an Access Gateway Function of the access network node 110.

The core network node 130 may comprise an input and output interface 1100 configured to communicate e.g. with the access network node 110. The input and output interface 1100 may comprise a wireless receiver (not shown) and a wireless transmitter (not shown).

The core network node 130 is configured to, e.g. by means of a first obtaining unit 1120 in the core network node 130, obtain a decision whether a monitored bandwidth over the fixed access is below a bandwidth requirement authorized to the UE 120. The bandwidth over the fixed access is adapted to be monitored for a data service session between the UE 120 and the Data Network via the fixed access.

In some embodiments, the decision of whether the monitored bandwidth over the fixed access is below a bandwidth requirement authorized to the UE 120 is arranged to be obtained, e.g. by means of the first obtaining unit 1120, from any one out of:
the UE 120,
a Customer Premises Equipment related the UE 120,
the access network node 110, and
an Access Gateway Function related to the access network node 110.

In some embodiments, the bandwidth over the fixed access for a data service session is arranged to be monitored during one or more periods of time with intermediate time intervals, and wherein the information about the monitored bandwidth is arranged to be obtained, e.g. by means of the first obtaining unit 1120, after a monitored period of time.

In some embodiments, the bandwidth requirement is arranged to be represented by a Maximum Bit Rate, MBR.

The core network node 130 is further configured to, e.g. by means of a second obtaining unit 1130 in the core network node 130, obtain a decision of how to handle the data service session based on the decision whether the monitored bandwidth over the fixed access is below the bandwidth requirement.

In some embodiments, the core network node 130 is configured to, e.g. by means of the second obtaining unit 1130, obtain the decision of how to handle the data service session based on the decision that the monitored bandwidth over the fixed access is below the bandwidth requirement by receiving it from a network node 140 comprising a Policy Control Function, after providing to said network node 140, the obtained information about the monitored bandwidth, and the decision whether the monitored bandwidth over the fixed access is below the bandwidth requirement authorized to the UE 120.

In some embodiments, the decision of how to handle the data service session is arranged to relate to any one or more out of:
whether or not to release the data service session,
whether to expose an alarm,
whether to inform a backend charging system,
whether to adjust the bandwidth requirement in line with the monitored bandwidth and
whether to use available radio access network resources by any one out of: directly utilizing an attached Radio Access Network, and by using radio based methods such as e.g. CA or DC, to fulfill the bandwidth requirements.

The core network node 130 may further be configured to, e.g. by means of a sending unit 1140, send to any one out of the access network node 110 and the UE 120, an instruction to monitor the bandwidth over the fixed access for the data service session, and to report to the core network node 130 when decided whether the monitored bandwidth over the fixed access is below the bandwidth requirement authorized to the UE 120.

The core network node 130 may comprise a Session Management Function related to the core network node 130 for handling the data service session in the packet communication network 100.

Figure 11A:
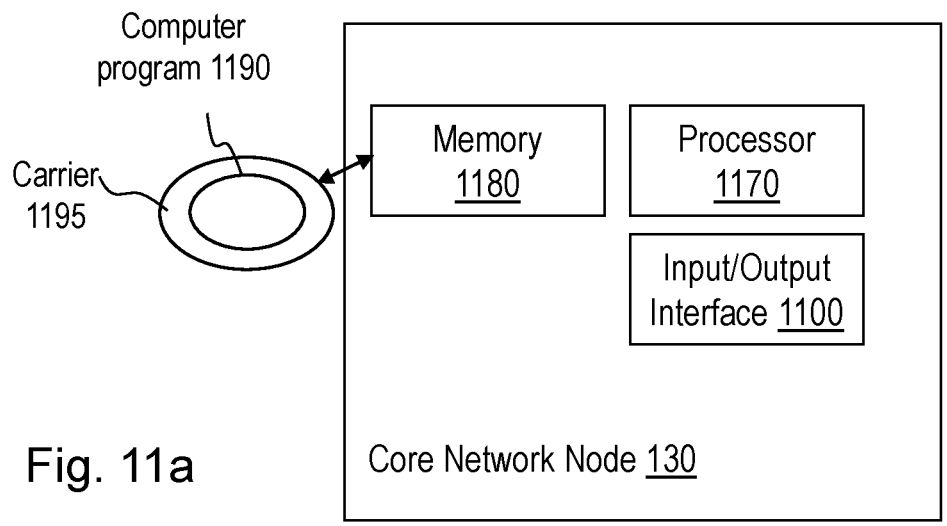
FIGS. 11a and b are schematic block diagrams illustrating embodiments of a core network node.
Figure 11B:
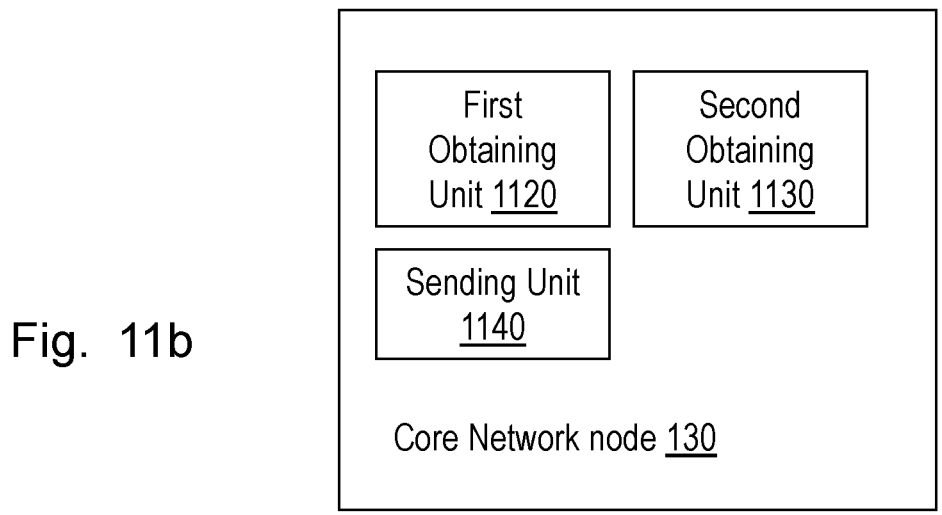

The embodiments herein may be implemented through a respective processor or one or more processors, such as a processor 1170 of a processing circuitry in the core network node 130 depicted in FIG. 11a, together with a respective computer program code for performing the functions and actions of the embodiments herein. The program code mentioned above may also be provided as a computer program product, for instance in the form of a data carrier carrying computer program code for performing the embodiments herein when being loaded into the core network node 130. One such carrier may be in the form of a CD ROM disc. It is however feasible with other data carriers such as a memory stick. The computer program code may furthermore be provided as pure program code on a server and downloaded to core network node 130.

The core network node 130 may further comprise a memory 1180 comprising one or more memory units. The memory comprises instructions executable by the processor 1170. The memory 1180 is arranged to be used to store e.g. information about monitored bandwidth, the bandwidth requirement authorized to the UE 120, and applications to perform the methods herein when being executed in the core network node 130.

Those skilled in the art will also appreciate that the units in the core network node 130 mentioned above may refer to a combination of analog and digital circuits, and/or one or more processors configured with software and/or firmware, e.g. stored in the core network node 130 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1190 comprises instructions, which when executed by the respective at least one processor 1170, cause the at least one processor 1170 of the core network node 130 to perform the actions above.

In some embodiments, a carrier 1195 comprises the computer program 1190, wherein the carrier 1195 is one of an electronic signal, an optical signal, an electromagnetic signal, a magnetic signal, an electric signal, a radio signal, a microwave signal, or a computer-readable storage medium.

Figure 12A:
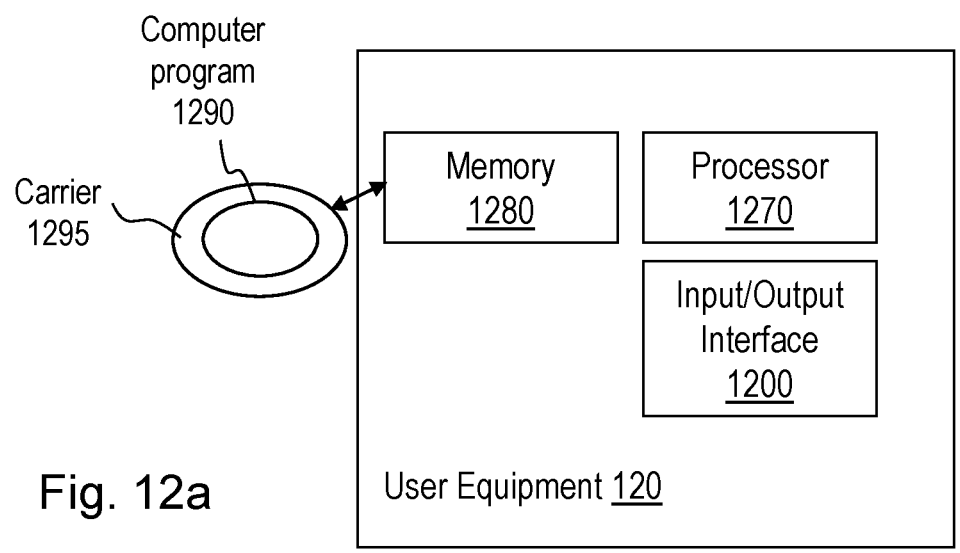
FIGS. 12a and b are schematic block diagrams illustrating embodiments of a UE.
Figure 12B:
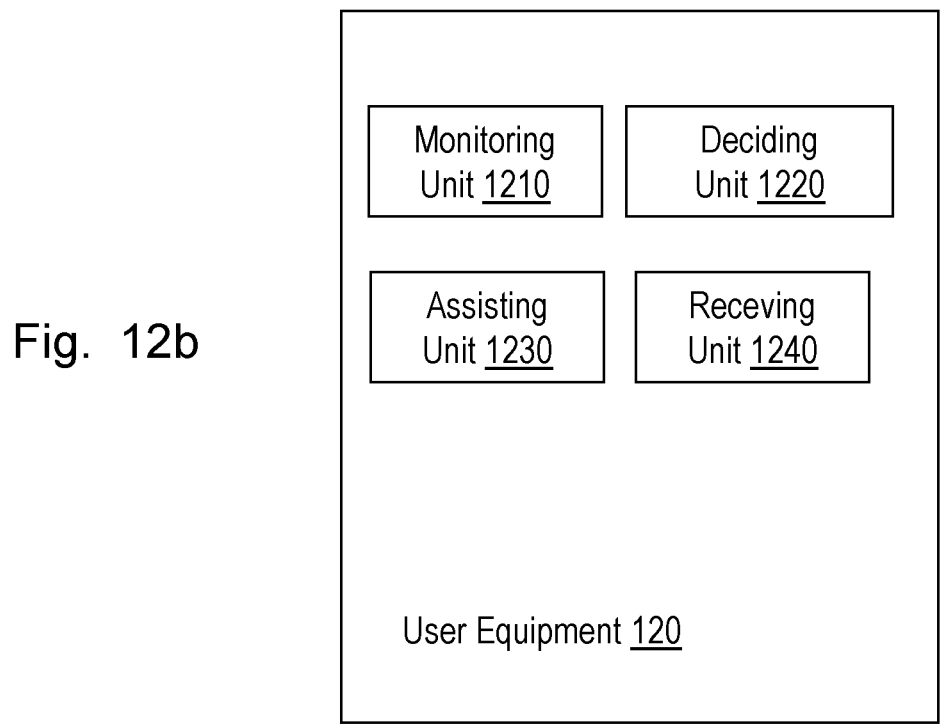

To perform the method actions above for assisting a core network node 130 in handling a data service session in a packet communication network 100, which packet communication network 100 is configured to support fixed access between the UE 120 and an access network node 110, the UE 120 may comprise the arrangement depicted in FIGS. 12a and 12b.

The UE 120 may comprise an input and output interface 1200 configured to communicate e.g. with the core network node 130. The input and output interface 1200 may comprise a wireless receiver (not shown) and a wireless transmitter (not shown).

The UE 120 is configured to, e.g. by means of a monitoring unit 1210 in the UE 120, monitor a bandwidth over the fixed access for a data service session between the UE 120 and the Data Network via the fixed access.

In some embodiments, the fixed access is arranged to be between a Customer Premises Equipment of the UE 120, and an Access Gateway Function of the access network node 110.

The UE 120 is further configured to, e.g. by means of a deciding unit 1220 in the UE 120, decide whether the monitored bandwidth over the fixed access is below the bandwidth requirement authorized to the UE 120.

In some embodiments, the bandwidth over the fixed access for the data service session is arranged to be, e.g. by means of the monitoring unit 1210, monitored by a Customer Premises Equipment related to the UE (120), and whether the monitored bandwidth over the fixed access is below the bandwidth requirement authorized to the UE (120) is arranged to be, e.g. by means of the deciding unit 1220, decided by the Customer Premises Equipment related the UE (120).

In some embodiments, the bandwidth over the fixed access for a data service session is arranged to be, e.g. by means of the monitoring unit 1210, monitored during one or more periods of time with intermediate time intervals. Furthermore, whether the monitored bandwidth over the fixed access is below the bandwidth requirement authorized to the UE 120 is arranged to be, e.g. by means of the deciding unit 1220, decided after a monitored period of time.

In some embodiments, the bandwidth requirement is arranged to be represented by a Maximum Bit Rate, MBR.

The UE 120 is further configured to, e.g. by means of an assisting unit 1230 in the UE 120, assist the core network node 130 in handling the data service session in the packet communication network 100 by sending to the core network node 130, the decision whether the monitored bandwidth over the fixed access is below the bandwidth requirement authorized to the UE 120.

In some embodiments, the UE 120 comprises a Customer Premises Equipment related to the UE 120 for assisting the core network node 130 in handling the data service session in the packet communication network 100.

The UE 120 may further be configured to, e.g. by means of a receiving unit 1240 in the UE 120, receive from the core network node 130 an instruction to monitor the bandwidth over the fixed access for the data service session, and to report to the core network node 130 when decided that the monitored bandwidth over the fixed access is below the bandwidth requirement authorized to the UE 120.

The embodiments herein may be implemented through a respective processor or one or more processors, such as a processor 1270 of a processing circuitry in the UE 120 depicted in FIG. 12a, together with a respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1280 comprising one or more memory units. The memory comprises instructions executable by the processor 1270. The memory 1280 is arranged to be used to store e.g. information about monitored bandwidth, the bandwidth requirement authorized to the UE 120, and applications to perform the methods herein when being executed in the UE 120.

Those skilled in the art will also appreciate that the units in the UE 120 mentioned above may refer to a combination of analog and digital circuits, and/or one or more processors configured with software and/or firmware, e.g. stored in the UE 120 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1290 comprises instructions, which when executed by the respective at least one processor 1270, cause the at least one processor 1270 of the UE 120 to perform the actions above.

In some embodiments, a carrier 1295 comprises the computer program 1290, wherein the carrier 1295 is one of an electronic signal, an optical signal, an electromagnetic signal, a magnetic signal, an electric signal, a radio signal, a microwave signal, or a computer-readable storage medium.

FURTHER EXTENSIONS AND VARIATIONS

Figure 13:
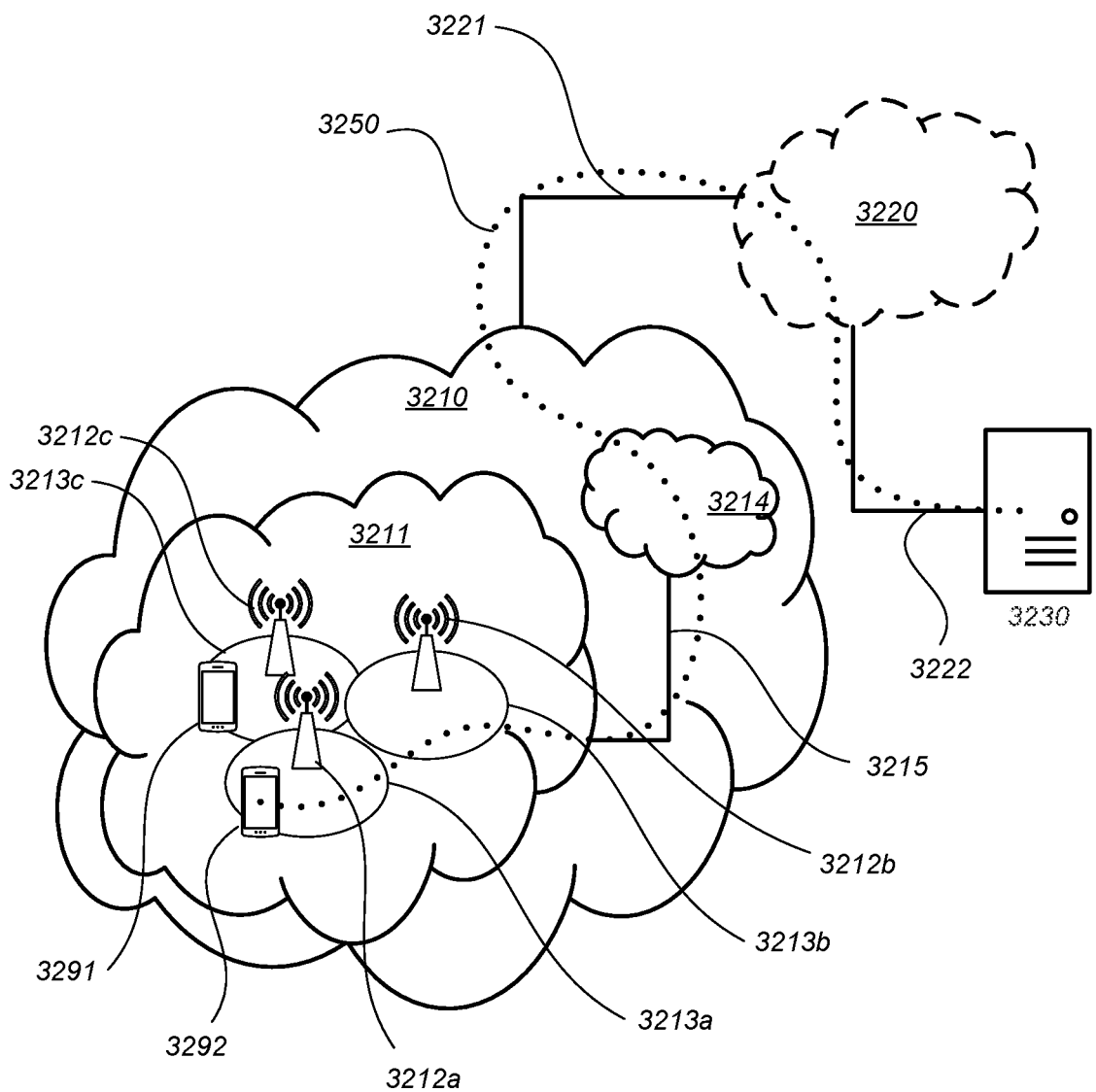
FIG. 13 schematically illustrates a telecommunication network connected via an intermediate network to a host computer.

With reference to FIG. 13, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the access node 110, access network nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
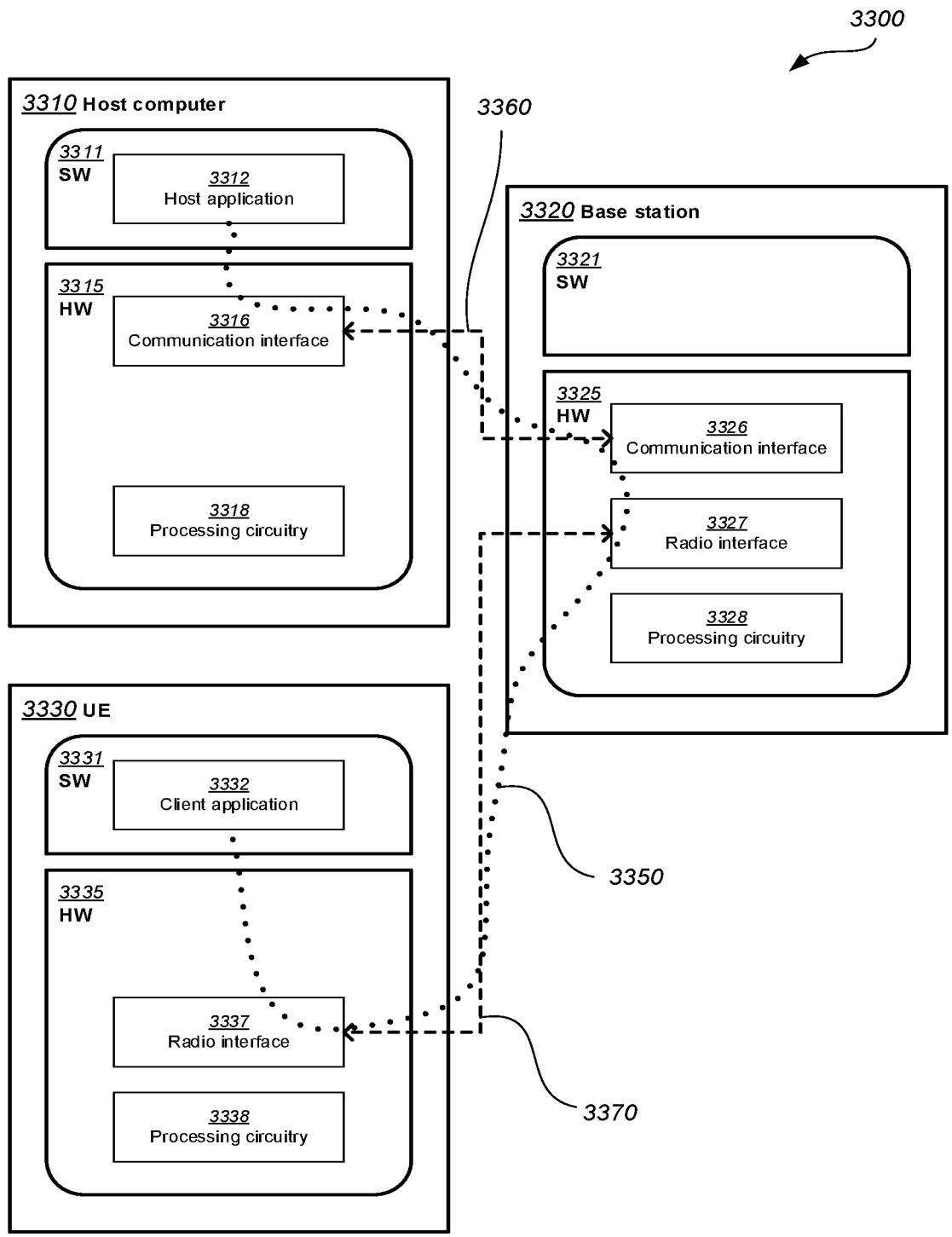
FIG. 14 is a generalized block diagram of a host computer communicating via a base station with a user equipment over a partially wireless connection.

It is noted that the host computer 3310, base station 3320 and UE 3330 illustrated in FIG. 14 may be identical to the host computer 3230, one of the base stations 3212a, 3212b, 3212c and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 12a and 12b. For simplicity of the present disclosure, only drawing references to FIG. 15 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 12a and 12b. For simplicity of the present disclosure, only drawing references to FIG. 16 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 17, 18:
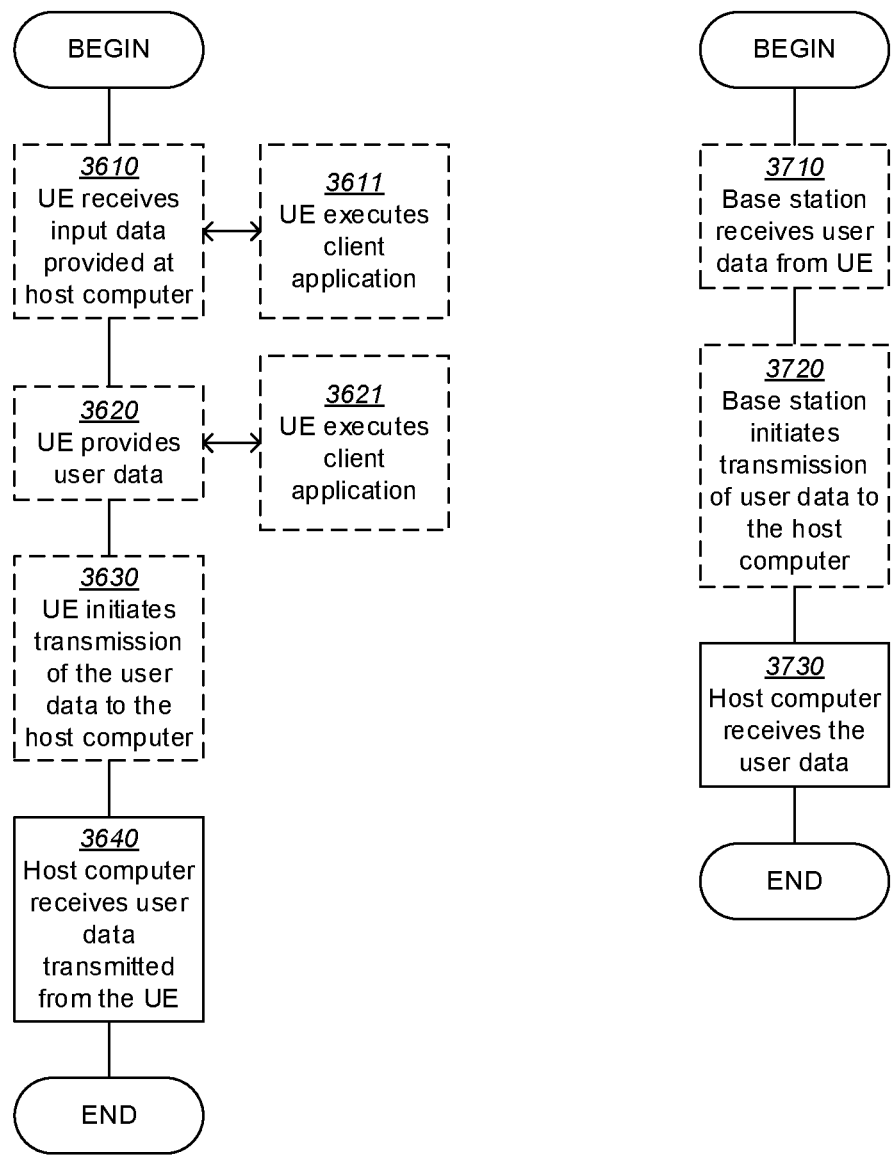

FIG. 17 is a flowchart illustrating a method implemented in a communication system, in accordance with one embodiment. The communication system includes a host computer, a base station such as a AP STA, and a UE such as a Non-AP STA which may be those described with reference to FIGS.

12a and 12b. For simplicity of the present disclosure, only drawing references to FIG. 17 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 12a and 12b. For simplicity of the present disclosure, only drawing references to FIG. 18 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a User Equipment, UE, for assisting a core network node in handling a data service session in a packet communication network, which packet communication network is configured to support fixed access between the UE and an access network node, the method comprising:
monitoring a bandwidth over the fixed access for a data service session between the UE and the Data Network via the fixed access,
deciding whether the monitored bandwidth over the fixed access is below the bandwidth requirement authorized to the UE, and
assisting the core network node in handling the data service session in the packet communication network by sending to the core network node, the decision whether the monitored bandwidth over the fixed access is below the bandwidth requirement authorized to the UE,
wherein the assisting is performed to assist a Policy Control Function of the core network node in handling the data service session in the packet communication network by sending to the Policy Control Function, the decision whether the monitored bandwidth over the fixed access is below the bandwidth requirement authorized to the UE, and
wherein the bandwidth over the fixed access for the data service session is monitored by a Customer Premises Equipment related the UE, and wherein whether the monitored bandwidth over the fixed access is below the bandwidth requirement authorized to the UE is decided, by the Customer Premises Equipment related the UE.

2. The method according to claim 1, wherein:
the bandwidth over the fixed access for a data service session is monitored during one or more periods of time with intermediate time intervals, and wherein whether the monitored bandwidth over the fixed access is below the bandwidth requirement authorized to the UE is decided after a monitored period of time.

3. The method according to claim 2, wherein:
the decision of how to handle the data service session based on the decision that the monitored bandwidth over the fixed access is below the bandwidth requirement, is provided by a network node comprising the Policy Control Function, after providing to the network node, the monitored bandwidth and the decision whether the monitored bandwidth over the fixed access is below the bandwidth requirement authorized to the UE.

4. The method according to claim 1, further comprising:
receiving from the core network node an instruction to monitor the bandwidth over the fixed access for the data service session, and to report to the core network node when decided that the monitored bandwidth over the fixed access is below the bandwidth requirement authorized to the UE.

5. The method according to claim 1, wherein the bandwidth over the fixed access for a data service session is monitored during one or more periods of time with intermediate time intervals, and wherein whether the monitored bandwidth over the fixed access is below the bandwidth requirement authorized to the UE is decided after a monitored period of time.

6. The method according to claim 1, wherein the bandwidth requirement is represented by a Maximum Bit Rate, MBR.

7. The method according to claim 1, wherein the fixed access is between a Customer Premises Equipment of the UE, and an Access Gateway Function of the access network node.

8. The method according to claim 1, wherein the method is performed by a Customer Premises Equipment related to the UE.

9. A User Equipment, UE, for assisting a core network node in handling a data service session in a packet communication network, which packet communication network is configured to support fixed access between the UE and an access network node, the UE further being configured to:
monitor a bandwidth over the fixed access for a data service session between the UE and the Data Network via the fixed access,
decide whether the monitored bandwidth over the fixed access is below the bandwidth requirement authorized to the UE,
assist the core network node in handling the data service session in the packet communication network by sending to the core network node, the decision whether the monitored bandwidth over the fixed access is below the bandwidth requirement authorized to the UE,
wherein the assisting is performed to assist a Policy Control Function of the core network node in handling the data service session in the packet communication network by sending to the Policy Control Function, the decision whether the monitored bandwidth over the fixed access is below the bandwidth requirement authorized to the UE, and wherein the bandwidth over the fixed access for the data service session is monitored by a Customer Premises Equipment related the UE, and wherein whether the monitored bandwidth over the fixed access is below the bandwidth requirement authorized to the UE is decided, by the Customer Premises Equipment related the UE.

10. The UE according to claim 9, wherein:

the bandwidth over the fixed access for a data service session is monitored during one or more periods of time with intermediate time intervals, and wherein whether the monitored bandwidth over the fixed access is below the bandwidth requirement authorized to the UE is decided after a monitored period of time.

11. The UE according to claim 10, wherein:

the decision of how to handle the data service session based on the decision that the monitored bandwidth over the fixed access is below the bandwidth requirement, is provided by a network node comprising the Policy Control Function, after providing to the network node, the monitored bandwidth and the decision whether the monitored bandwidth over the fixed access is below the bandwidth requirement authorized to the UE.

12. The UE according to claim 9, further being configured to:

receive from the core network node, an instruction to monitor the bandwidth over the fixed access for the data service session, and to report to the core network node when decided that the monitored bandwidth over the fixed access is below the bandwidth requirement authorized to the UE.

13. The UE according to claim 9, wherein the bandwidth over the fixed access for a data service session is arranged to be monitored during one or more periods of time with intermediate time intervals, and wherein whether the monitored bandwidth over the fixed access is below the bandwidth requirement authorized to the UE is arranged to be decided after a monitored period of time.

14. The UE according to claim 9, wherein the bandwidth requirement is arranged to be represented by a Maximum Bit Rate, MBR.

15. The UE according to claim 9, wherein the fixed access is arranged to be between a Customer Premises Equipment of the UE, and an Access Gateway Function of the access network node.

16. The UE according to claim 9, wherein the UE comprises a Customer Premises Equipment related to the UE for assisting the core network node in handling the data service session in the packet communication network.

* * * * *